INVENTORS:
Walter G. Edwards
Edmund F. Klein
James F. Hudson

By Louis A. Kline
John J. Matlago
Their Attorneys

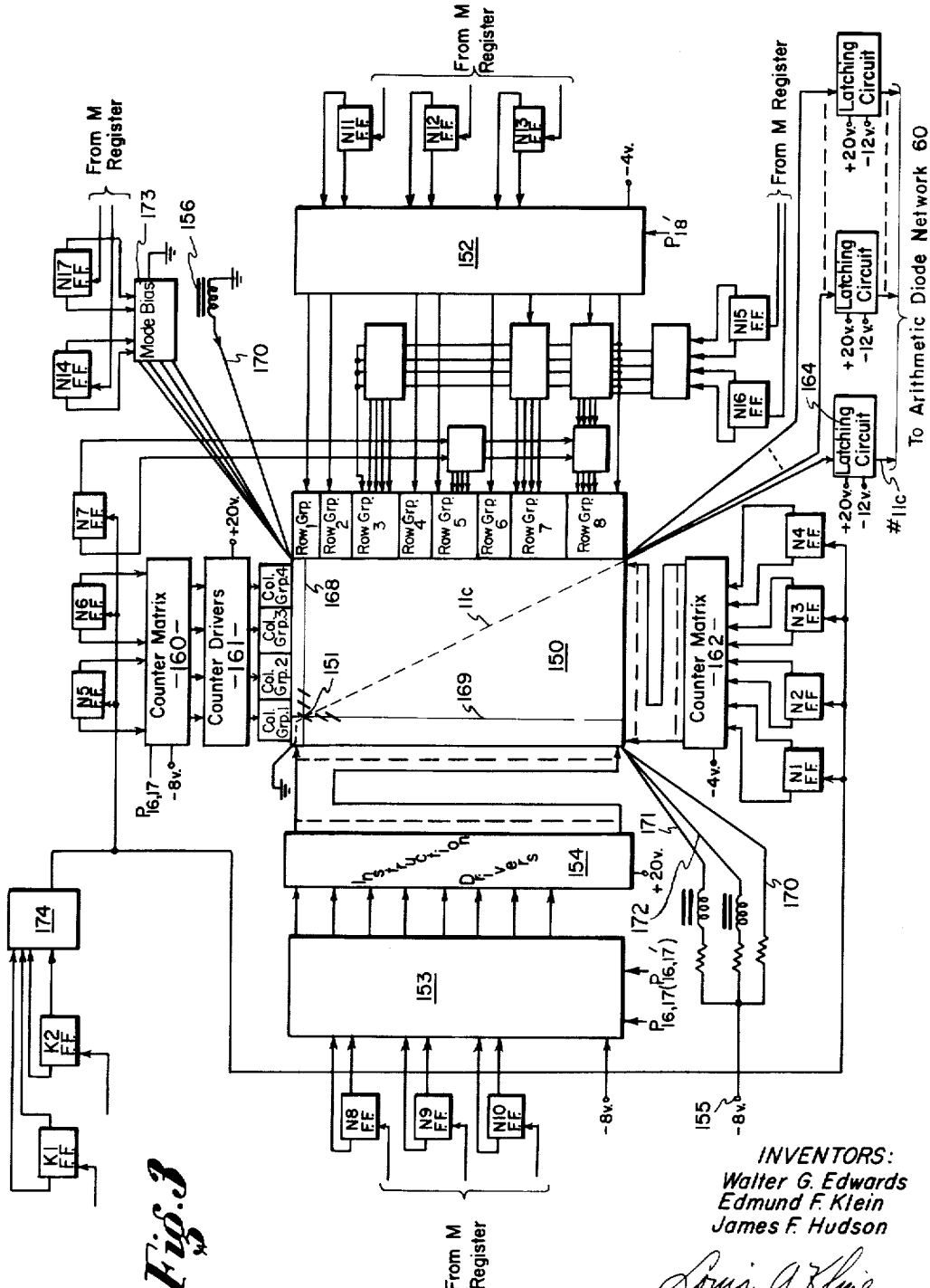

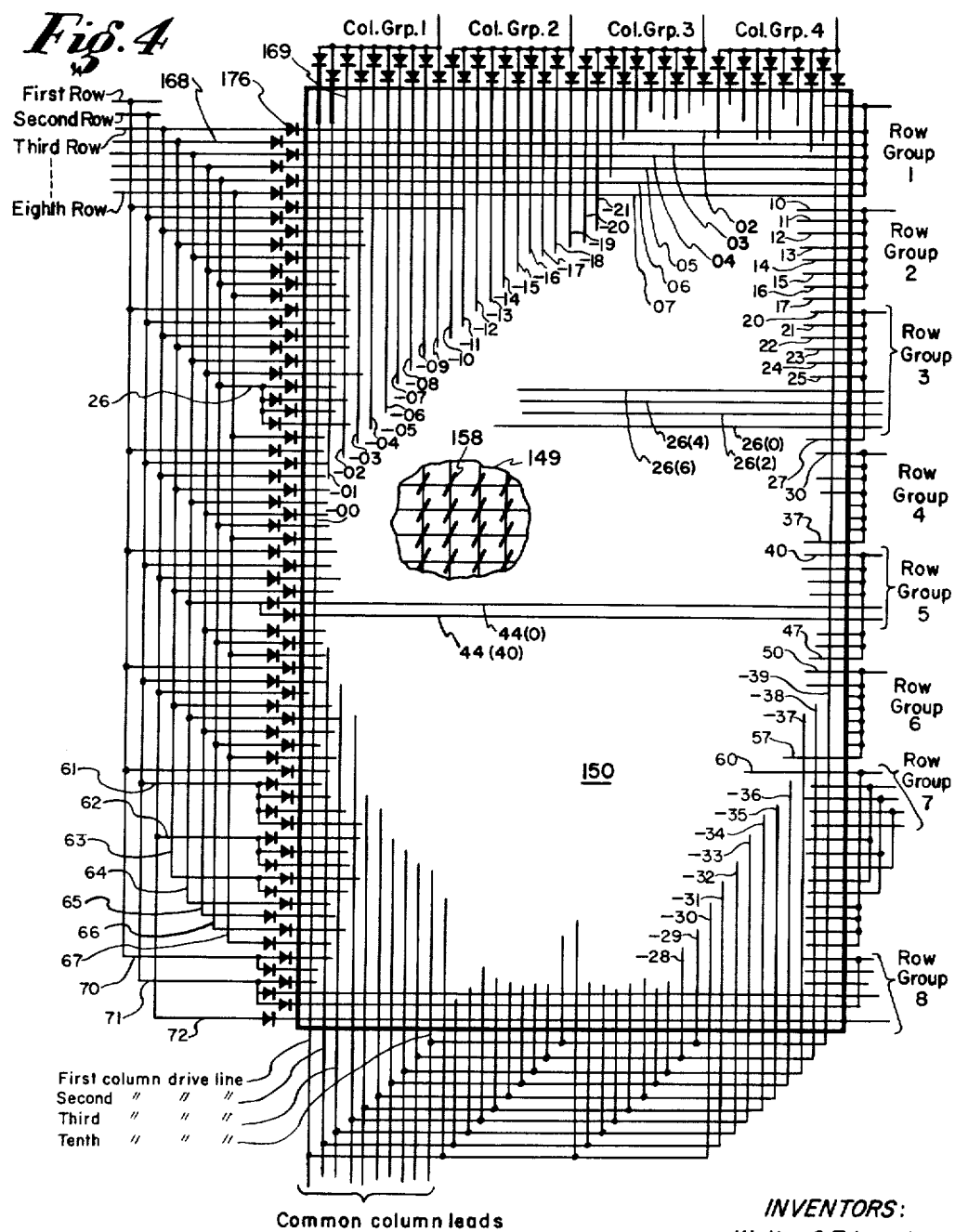

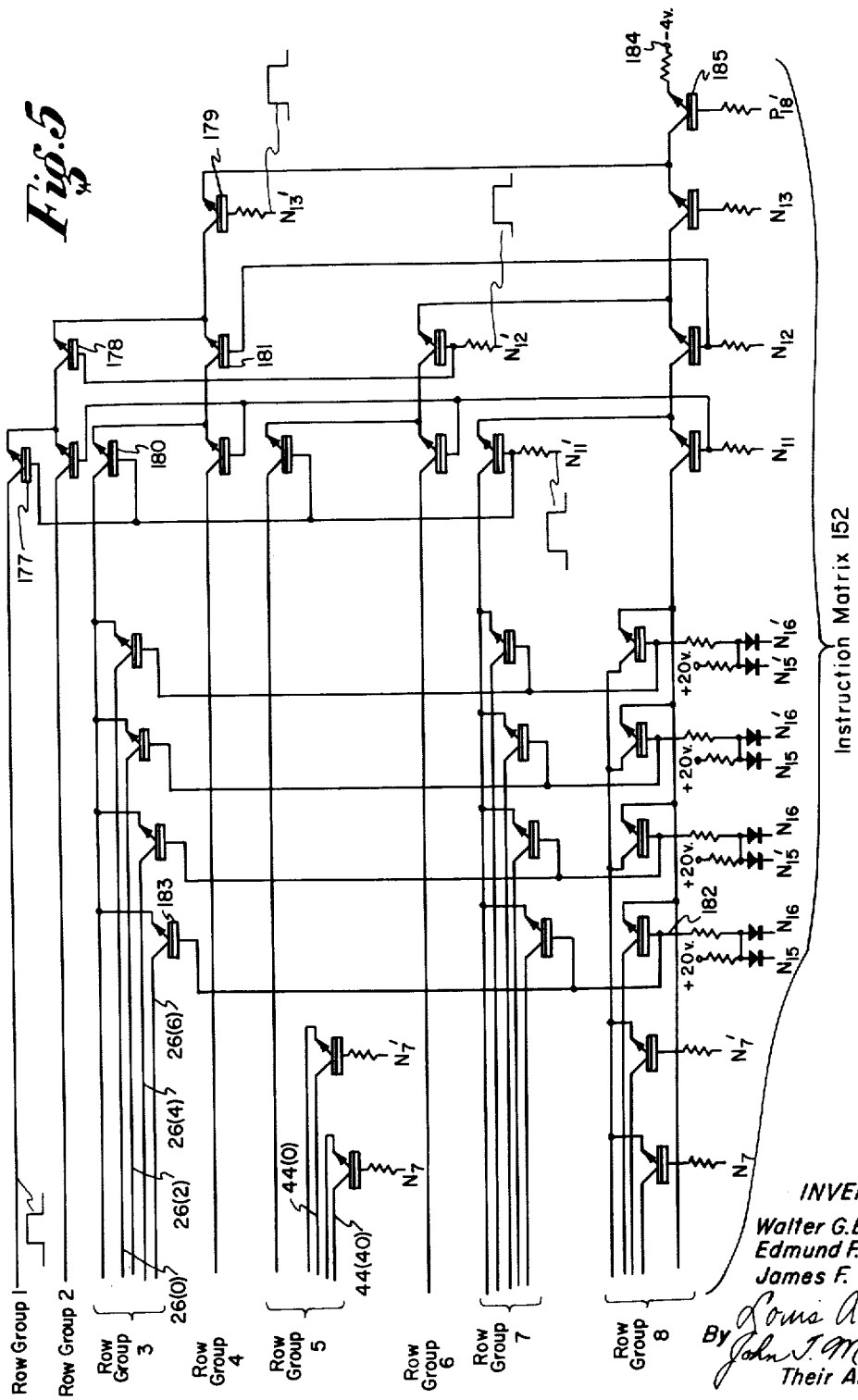

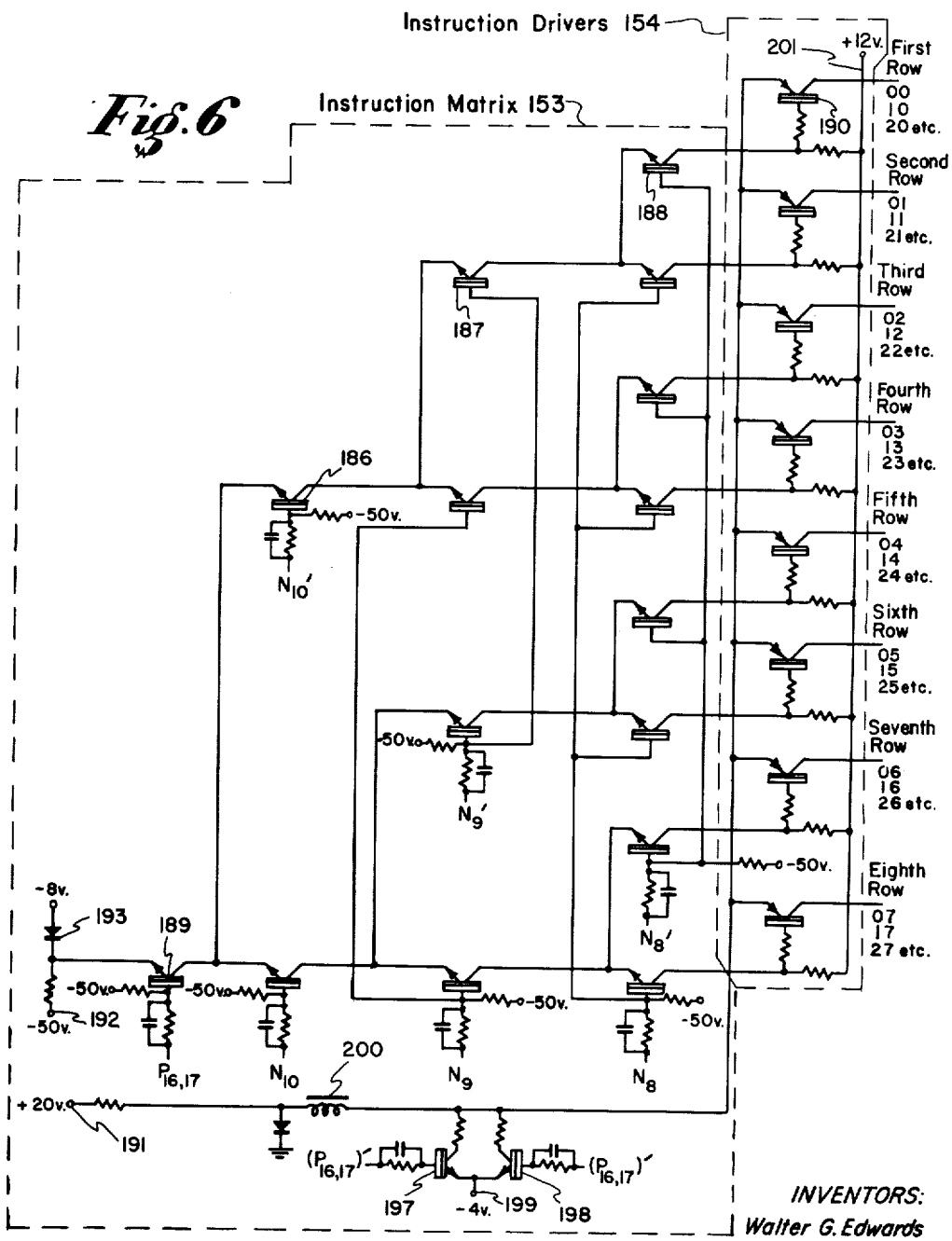

July 3, 1962  W. G. EDWARDS ETAL  3,042,305
PROGRAM CONTROL APPARATUS
Filed March 10, 1958  20 Sheets-Sheet 7

Fig. 7

| | | Instruction Register | | | | | | | | |
|---|---|---|---|---|---|---|---|---|---|---|
| | | Mode Selection FFS | | | | Command Level FFS | | | | |
| Row | Command | NI7 | NI6 | NI5 | NI4 | NI3 | NI2 | NII | NI0 | N9 | N8 |
| 01 | Add | 0 | | | | 0 | 0 | 0 | 0 | 0 | 1 |
| 02 | Subtract | 0 | | | | 0 | 0 | 0 | 0 | 1 | 0 |
| 03 | Multiply | 0 | | | 0 | 0 | 0 | 0 | 0 | 1 | 1 |
| 04 | Divide Integer | 0 | | | 0 | 0 | 0 | 0 | 1 | 0 | 0 |
| 07 | Modify Subt. | 0 | | | | 0 | 0 | 0 | 1 | 1 | 1 |
| 10 | Extract | 0 | | | | 0 | 0 | 1 | 0 | 0 | 0 |
| 26 | Misc. Test | 0 | 0 | 0 | | 0 | 1 | 0 | 1 | 0 | 0 |
| 44 | Merge | 0 | | 0 | 0 | 1 | 0 | 0 | 1 | 0 | 0 |
| 71 | Fill | 0 | | 0 | | 1 | 1 | 1 | 0 | 0 | 1 |
| 72 | Tape Branch Flow | 0 | 0 | 0 | 0 | 1 | 1 | 1 | 0 | 1 | 0 |

Fig. 8

| | Counter Flip Flops | | | | | | |
|---|---|---|---|---|---|---|---|
| Count (operations block) | N7 (40) | N6 (20) | N5 (10) | N4 (8) | N3 (4) | N2 (2) | N1 (1) |
| 00 | 0 | 0 | 0 | 0 | 0 | 0 | 0 |
| 01 | 0 | 0 | 0 | 0 | 0 | 0 | 1 |
| 02 | 0 | 0 | 0 | 0 | 0 | 1 | 0 |
| 03 | 0 | 0 | 0 | 0 | 0 | 1 | 1 |
| 04 | 0 | 0 | 0 | 0 | 1 | 0 | 0 |
| 05 | 0 | 0 | 0 | 0 | 1 | 0 | 1 |
| 06 | 0 | 0 | 0 | 0 | 1 | 1 | 0 |
| 07 | 0 | 0 | 0 | 0 | 1 | 1 | 1 |
| 08 | 0 | 0 | 0 | 1 | 0 | 0 | 0 |
| 09 | 0 | 0 | 0 | 1 | 0 | 0 | 1 |
| 10 | 0 | 0 | 1 | 0 | 0 | 0 | 0 |
| 11 | 0 | 0 | 1 | 0 | 0 | 0 | 1 |
| 12 | 0 | 0 | 1 | 0 | 0 | 1 | 0 |
| 13 | 0 | 0 | 1 | 0 | 0 | 1 | 1 |
| 77 | 1 | 1 | 1 | 0 | 1 | 1 | 1 |
| 78 | 1 | 1 | 1 | 1 | 0 | 0 | 0 |
| 79 | 1 | 1 | 1 | 1 | 0 | 0 | 1 |

INVENTORS:
Walter G. Edwards
Edmund F. Klein
James F. Hudson

By Louis A. Kline
John T. Maclago
Their Attorneys

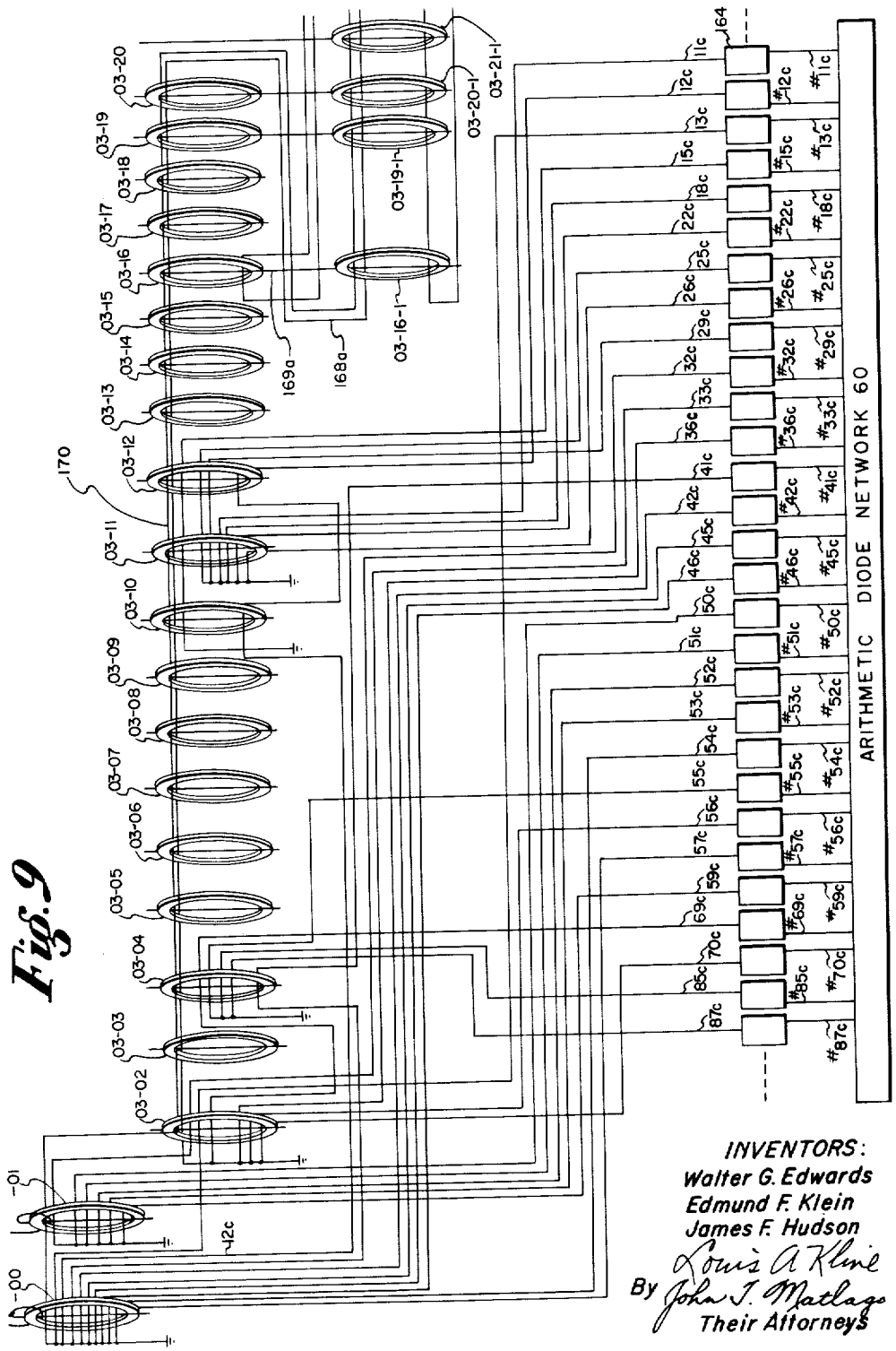

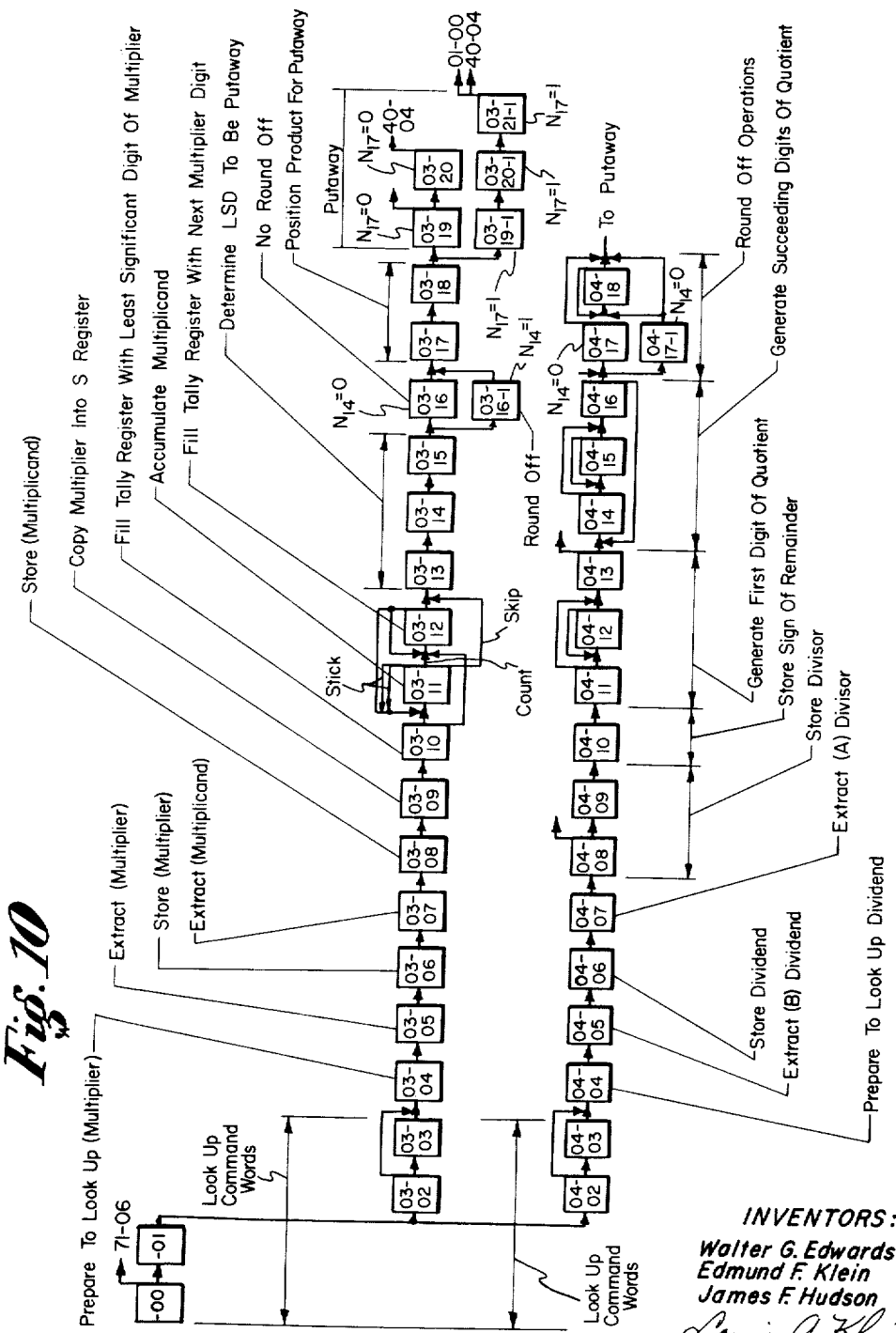

July 3, 1962 W. G. EDWARDS ETAL 3,042,305
PROGRAM CONTROL APPARATUS
Filed March 10, 1958 20 Sheets-Sheet 10

INVENTORS:
Walter G. Edwards
Edmund F. Klein
James F. Hudson

By *Louis A. Kline*
*John J. Matlago*
Their Attorneys

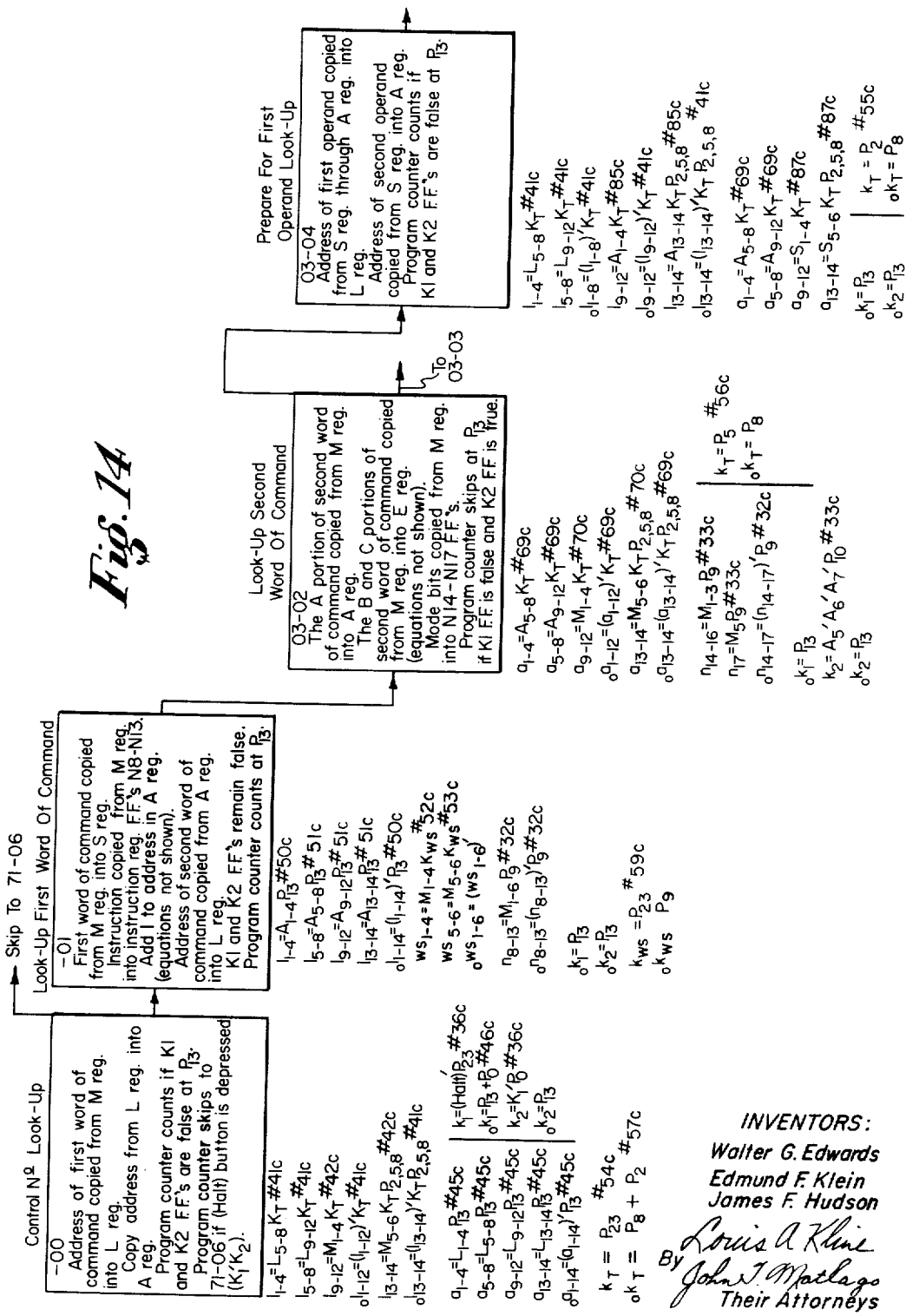

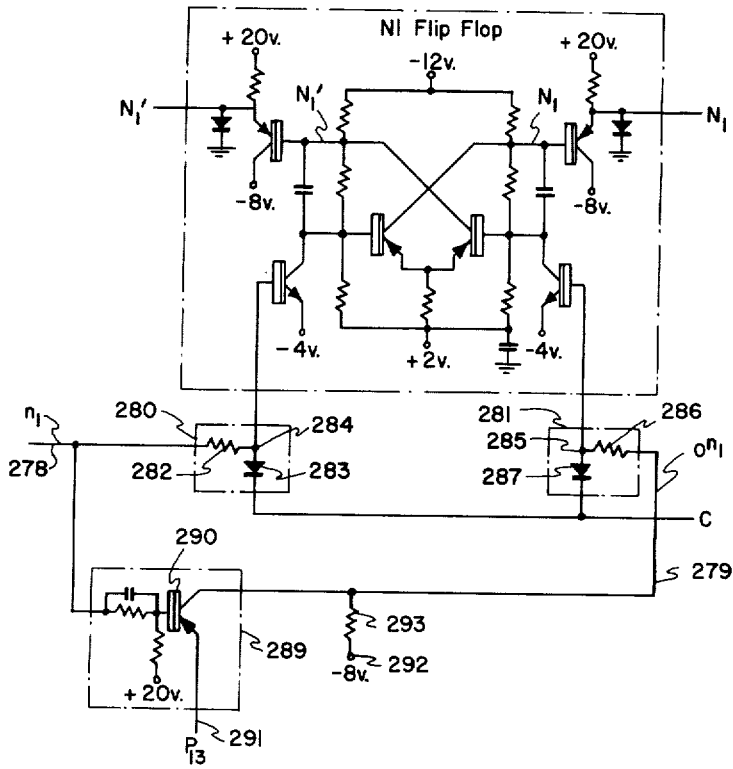

INVENTORS:
Walter G. Edwards
Edmund F. Klein
James F. Hudson

By *Louis A. Kline*
*John T. Matlago*
Their Attorneys

| Count | $n_5=(K_1' K_2' P_{13})(N_1 N_4 N_5' + N_1' N_5 + N_4' N_5)$ | $n_6=(K_1' K_2' P_{13}) [N_1 N_4 N_5 N_6' + N_6(N_1'+N_4'+N_5')]$ | $n_7=(K_1' K_2' P_{13}) [N_1 N_4 N_5 N_6 N_7' + N_7(N_1'+N_4'+N_5'+N_6')]$ |
|---|---|---|---|
| Skip #1 | $n_5 = K_1' K_2 P_{13}$ #15c | $n_6 = K_1' K_2 P_{13}$ #16c | $n_7 = K_1' K_2 P_{13}$ #17c |
| Skip #2 | $n_5 = K_1 K_2 P_{13}$ #22c | $n_6 = K_1 K_2 P_{13}$ #23c | $n_7 = K_1 K_2 P_{13}$ #24c |
| Skip #3 | $n_5 = K_1 K_2' P_{13}$ #29c | $n_6 = K_1 K_2' P_{13}$ #30c | $n_7 = K_1 K_2' P_{13}$ #31c |
| Reset | $_0 n_5 = P_{13}(n_5)'$ | $_0 n_6 = P_{13}(n_6)'$ | $_0 n_7 = P_{13}(n_7)'$ |

*INVENTORS:*
*Walter G. Edwards*
*Edmund F. Klein*
*James F. Hudson*

By *Louis A. Kline*
*John J. Matlago*
*Their Attorneys*

INVENTORS:
Walter G. Edwards
Edmund F. Klein
James F. Hudson

By Louis A. Kline
John T. Matlago
Their Attorneys

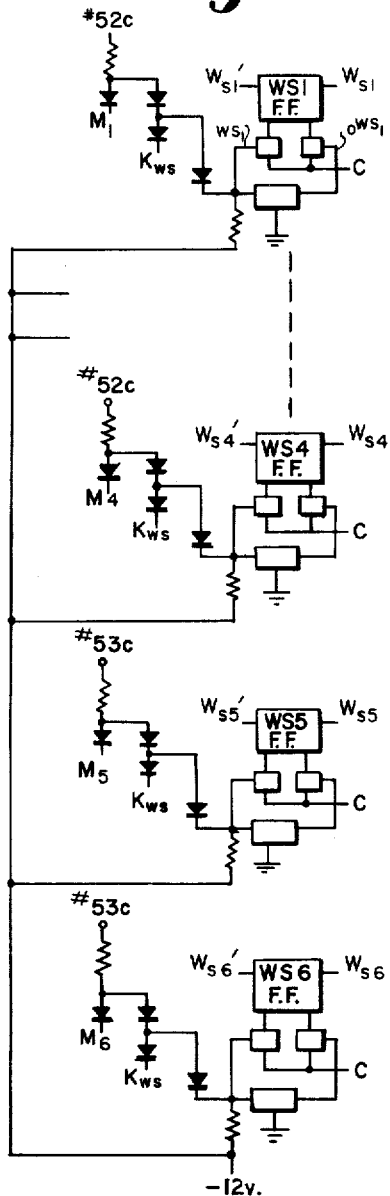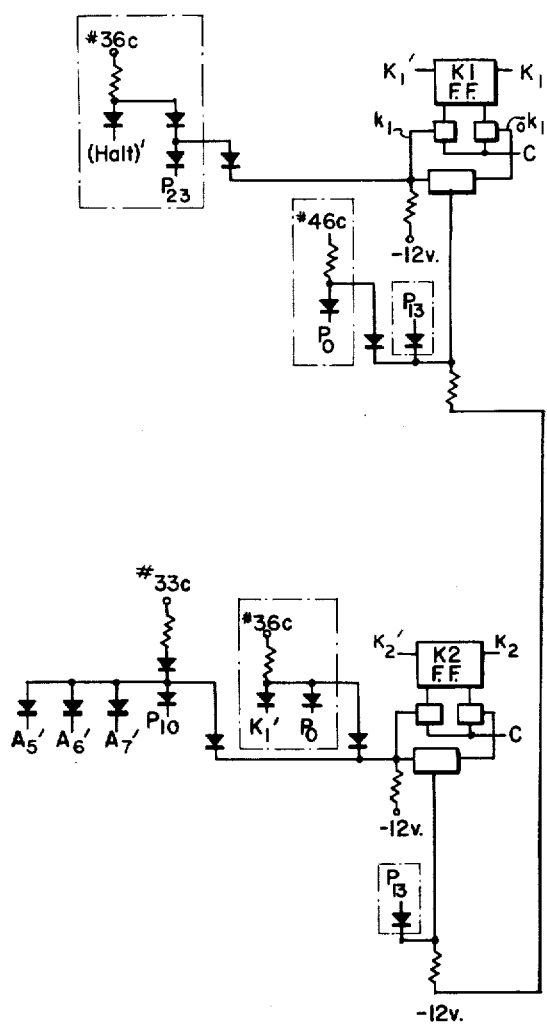
Fig. 23
Fig. 22
INVENTORS:
Walter G. Edwards
Edmund F. Klein
James F. Hudson
By Louis A. Kline
John T. Matlago
Their Attorneys INVENTORS:
Walter G. Edwards
Edmund F. Klein
James F. Hudson By Louis A. Kline
John J. Matlago
Their Attorneys

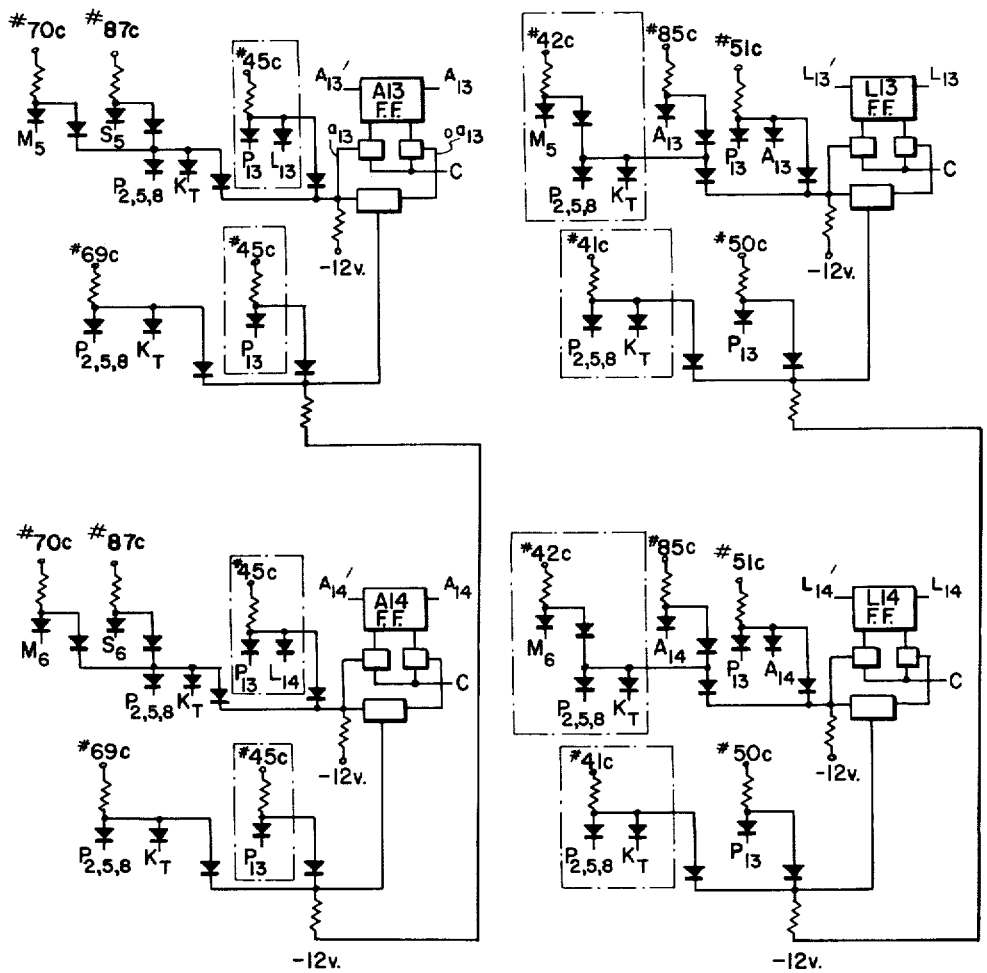

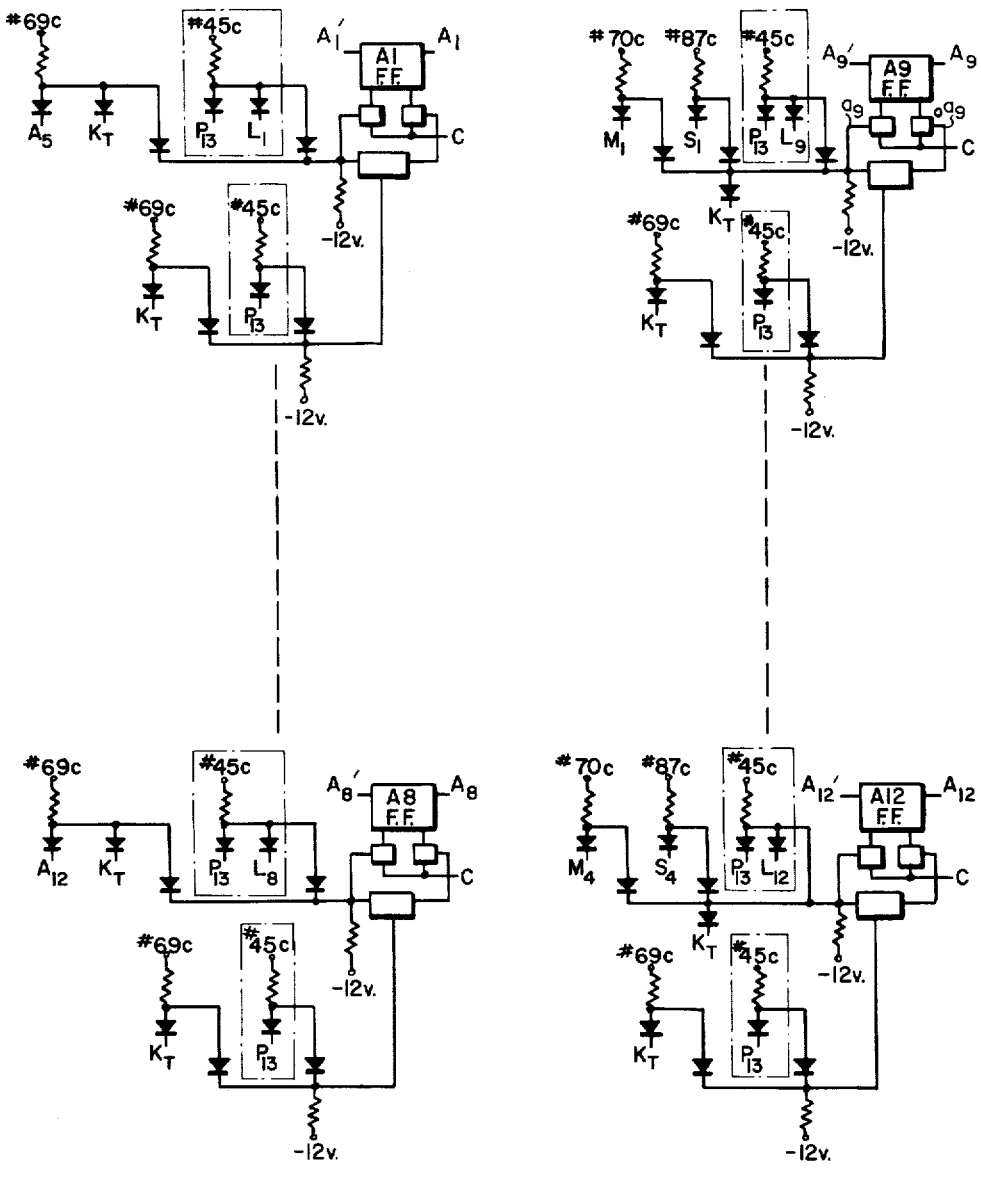

3,042,305
PROGRAM CONTROL APPARATUS
Walter G. Edwards, Manhattan Beach, James F. Hudson, Hermosa Beach, and Edmund F. Klein, San Pedro, Calif., assignors to The National Cash Register Company, Dayton, Ohio, a corporation of Maryland
Filed Mar. 10, 1958, Ser. No. 720,384
22 Claims. (Cl. 235—157)

This invention relates to data processing apparatus control systems, and more particularly to an improved program control means for selecting networks for operating upon data in successive operation intervals of a digital data processor.

In the prior art it is known how all the processes performable by the central data processor of a digital computer system can be divided into sequential operation intervals, each operation interval commensurate with a predetermined fixed duration of time, such as a word period, for example. The logical networks for carrying out the logical processes are controlled by a variable sequence program control apparatus which selectively renders certain logical networks operable during each operation interval.

More particularly, in a known prior art system the program control means comprises a counter which has a unique count output for each sequential operation interval. Each program counter output line is connected to one of the inputs of a logical network, which network is to be rendered operable by the count signal from the counter. When a particular logical network is desired to be rendered operable during many of the sequential operation intervals provided for the computer, each of the counter lines designating one of the operation intervals is connected to one of the inputs of a logical "or" circuit whose single output has impressed thereon a signal, designated a program counter logical sum, operable to render the logical network operable during each of these operation intervals. In this manner, the same logical network can be used and selected when required by means of the logical "or" circuit. In the prior art system, wherein diodes are utilized to form the logical networks, each logical network to be selectively rendered operable, during a plurality of the sequential operation intervals of the computer, requires a separate diode logical "or" circuit for generating the program counter logical sum signals. Those logical networks which are used in many of the sequential operation intervals of the computer thus require many program counter lines to be connected by diodes to the logical "or" circuits. Therefore, when using this approach for designing control systems or devices in large computers, an excessive amount of diode circuitry is required for program control; and a large amount of power is required for operation.

The present invention comprises an improved and simplified program control system and apparatus to control the operations of a data processor by sequentially selecting sets of logical networks to be effective during successive operations intervals (hereinafter termed operations blocks) by effectively employing non-linear devices such as magnetic core circuitry to replace the logical "or" circuits of the prior art in generating the required program counter logical sum signals.

In general, the data processing operations of the machine controlled by the present program control system are divided to perform "commands," any specific one of which constitutes a series of related block operations usually performed in sequential order. A command is composed of as many operations blocks as may be required to allow performance of all the required operations. Each operations block requires an interval of time for performance of the operations thereto assigned, and this interval of time, which with minor exceptions may be substantially the same for any and all of the operations blocks, is termed in the present disclosure the basic operating cycle of the machine.

The basic operating cycle of the machine is defined by a counter actuated by clock pulses as provided by a generator producing pulses at a 400 kc./sec. frequency, for example. This counter repeats its cycle of counting once for each twenty-four clock pulses, whereby there is provided a repetitive basic operating cycle which in this example includes twenty-four clock pulses. Within the cycle the twenty-four intervals of time are termed periods and are designated by the capital letter P with a numerical subscript indicating the place of the interval within the cycle, $P_0$–$P_{23}$. Also, the counter has a like number of output lines, similarly numbered and each of which is changed from low potential to high potential state for only the duration of its respective twenty-fourth of the cycle.

In a data processing system in which the control apparatus of the present invention is adapted to function as an operations control unit, information or data is stored in a suitable memory, such as a magnetic core memory comprising one or more arrays of bistable magnetic cores. The two stable states of a core in the memory are assigned values represented by "1" and "0," respectively. In the memory, six cores are assigned to each character position, and ten character positions constitute a "word," which occupies a "cell" or storage location in the memory. As well understood in the art, the storage capacity of a memory may be a thousand or more "cells" in which commands and numbers may be stored as words.

The exemplary basic operating cycle of the present system has various portions thereof, in a sense, reserved for performance of specific computer functions; and for reasons hereinafter made apparent the operations of the basic cycle are considered to start with the commencement of period $P_{16}$ and to terminate at the conclusion of period $P_{15}$. In the exemplary apparatus, assignment of portions of the basic operating cycle for specific functions may comprise $P_{16}$–$P_{19}$ for forming computer program control signals, $P_{20}$–$P_{22}$ for reading a predesignated cell of the core memory into an operating register, $P_{23}$–$P_{10}$ for logical operations of diverse natures on information as shifted out of and into the operating register and other registers provided for the processor, $P_{11}$–$P_{13}$ for writing from the operating register block into the predesignated cell of the memory, and $P_{14}$–$P_{15}$ for resetting certain control devices which are set during the program control signal selection in the previously described $P_{16}$–$P_{19}$ interval. These and other exemplary assignments of portions of the exemplary basic operating cycle of twenty-four periods will hereinafter be considered in greater detail, but it is important to note that a wide variety of logical operations may be carried out on the information in each of the twelve periods $P_{23}$–$P_{10}$.

Thus it is seen that in addition to providing time for performing the logical operations required during a basic operating cycle, the present system arrangement also provides time for the central data processor to communicate with a predesignated "cell" of the memory, and for the program control device to be set up and control signals formed for selecting the circuits of the central data processor to be rendered operable during the logical operation portion of the operating cycle.

The program control system, which is brought into an active state during the previously defined portions of the basic operating cycle, comprises a program control device having an array of non-linear devices such as magnetic cores, each assigned to and controlling the logical operations portion of a basic cycle as described by a respective operations block. Since operations capable of being performed by the data processor are divided into related groups or "commands," and since each command comprises a plurality of operations blocks each of which is assigned to a respective core, it is convenient to consider the array of cores as arranged in rows, generally one row for each command. Further, for convenience in designation and selection for operation, it is desirable to consider the cores of the array as arranged in columns. The identifying designation of a core may thus be by row (command level) and column numbers, according to a plan hereinafter explained. This general concept will, with only specifically defined exceptions, be adhered to in the description of an exemplary form of the invention. Each of the cores is assigned the function and ability to control the set of one or more operations to be performed during a specific operations block to which the core is exclusively committed, and when that core is driven (changed) non-linearly in a manner hereinafter explained, certain circuitry is brought into active state and the operations defined by that operations block will be carried out. The aforementioned numerical designations assigned to a core may in each instance conveniently also serve to identify the respective corresponding operations block assigned to the core. In general, the cores assigned to a particular command (series of related operations blocks) are rendered active in the order of their numbering to cause performance of data processing operations in a predetermined sequence, but it is to be noted that this is not invariably the case and that a specific operations block may be succeeded by itself in a repeat or "sticking" procedure, or one or more operations blocks may be skipped by a "skipping" procedure, as will hereinafter be made clearly evident.

From the foregoing general description it is evident that in operation of the processor, a command level must be selected, and the steps of the command, as defined by the operations blocks or subdivisions thereof, executed, by sequential selection and turning over of cores of the control device array. Initial operations in all commands are defined in two operations blocks which are assigned to two cores which therefore are common to all command levels (rows). Hence driving of the first of these cores initiates automatic operation of the processor. In general, with the exception of the noted cores common to all commands, selection of a specific core of the array is effected by a modified procedure according to the well-known coincident current mode. Row and column drive lines are provided, one row drive line for each row and linked to each of the cores in its respective row and one column drive line for each column and linked to each of the cores in its respective column. The cores are all normally biased to an inactive state by current through a main bias line; and a core is selected and temporarily driven to an active state by concurrent application of driving currents (pulses) through the row and column drive lines linked to that core, the driving current effects being sufficient to overcome that of the main bias current and to non-linearly change the core. After decay of the driving currents the driven core is returned to the normal "rest" state by the main bias current effect. These operations, and the exceptions to the general procedure, are performed by means presently described. For convenience and simplicity in selection of individual cores, the rows are divided into row groups, and the columns into column groups; and the respective drive lines are so connected at one set of ends as to provide group drive leads, and at the other set of ends to provide single drive leads each of which is connected to one drive line only of each group. With this arrangement, in selecting a specific core according to the general procedure the proper row line to be pulsed is selected by two contemporaneously existing arrangements of flip-flops serving as an "instruction" register, one of the arrangements closing a drive circuit through a row group lead and the other arrangement closing the drive circuit through a single line drive lead. Similar operational arrangements of two sets of counter (column-selecting) flip-flops connect a specified one of the column drive lines in a driving circuit. The two completed driving circuits are concurrently pulsed to turn over the selected core. In general, the counter flip-flops select cores one after the other in succession within a selected row (command); but this is subject to sticking (repeating) and skipping (jumping) as previously indicated. Whether the counter "sticks" or "skips" or merely continues straight-forward sequential column line selection (counting) within the selected row is made dependent upon decision logical operations performed by a decision unit, as will hereinafter be explained in detail.

Each core of the array has inductively linked or coupled thereto a respective set of one or more "sense" lines or conductors, whereby an output or sense signal is produced in each line of that set of sense lines when the magnetic state of the core changes. Each of the sense lines is connected as an input to a respective one of a series of latching circuits hereinafter termed latches. A particular sense line may be inductively linked to more than one core, whereby a sense signal is created on that line and the respective latch operated when any one of the several cores to which the sense line is linked is "driven." Each of the latches is so constructed and arranged that upon appearance of a sense signal on its input, it operates or is "set-up" and provides an output signal which endures and continues after termination of the input signal until the latch is reset by a special reset signal. It is evident, then, that selection of any core which is linked by the sense line feeding a particular latch will set up that latch. Also, it is evident that when a particular core of the array is selected, every sense line linked to that core will have a sense signal induced therein, and accordingly the several respective latches fed by those sense lines will be set up, i.e., latched. Each latch has as its output a respective control line which is effective, when the latch is set up, to supply operating potential for a group of one or more specific logical networks which are to be operative during the operations block corresponding to the selected core; or, alternatively, to provide a proposition potential for one or more logical sum nets in the specific logical networks. Since cores are selected one at a time and one for each basic operating cycle, the operational logical circuits for a particular basic operating cycle may be chosen and activated in response to selection of a single core, independently of the operations to be performed in other cycles. Resetting of all set-up latches at the termination or end of each operating cycle "releases" or deactivates all the latches and logical circuits used in that cycle and permits the system to proceed with the next cycle of operations.

When a group of one or more logical networks is to be used in each of two or more basic operating cycles, that is, during a plurality of the aforementioned "blocks," it is evident that a particular latch may be assigned to that group of logical networks, and the sense line forming the input to that latch inductively linked to each of the cores corresponding to those blocks. The economy of this feature of the system is evident.

As hereinbefore indicated, selection of a core representing a particular block or group of operations involves, in general, selection and energization of a row line and a column line of the core array drive lines. In some instances it is desirable to be able to selectively choose one or the other of two variations of a group of operations when a particular row and a particular column is selected in the normal sequence of computer operations; and provision is made for accommodating this desirable variation. For that purpose there is included in the array or matrix, alternate or "sub-row" cores which for convenience are considered to be situated in sub-rows, although these alternate or "substitute" cores may physically be in the same row, or elsewhere. When the row drive and the column drive are energized to select a core at the intersection of the respective row and column, either the row core, or the sub-row core, may be selected. The selection is governed by special auxiliary (mode) bias means hereinafter explained and described. Flexibility of computer control is thus enhanced.

From the preceding general description it is evident that by employing non-linear cores each representing and controlling a group of computer operations during a respective basic operating cycle, and latches a plurality of which may be activated by operation of a single core and each of which latches may be activated by turnover operation of any of a predetermined set of cores, and by controlling a group of logical circuits with each latch, great flexibility of control may be attained while using a minimum number of logical circuits and associated hardware.

It is thus an object of the invention to provide an improved computer program control system and apparatus therefor.

Another object of this invention is to provide novel circuitry for selecting various forms of logical circuitry to be operable during each operations interval allotted to the execution of a command.

Another object of this invention is to provide a novel highly simplified magnetic core circuitry arrangement for selectively rendering operable a particular logical network or set of logical networks during each operations-interval of a program that the network is called for.

Another object of this invention is to provide a program control device comprising a plurality of magnetic cores each core representing and sequentially operating to control a group of computer operations during a respective basic operating cycle of the machine.

Additional objects and advantages of the invention will hereinafter be made apparent or will become apparent or be made so in the appended claims, a preferred exemplary physical embodiment being hereinafter described with references to the accompanying drawings forming part of the application and in which drawings:

FIG. 3 is a schematic block diagram of the program control apparatus of this invention;

FIG. 4 is a fragmentary wiring diagram of the program control core array with a portion magnified for portrayal of details;

FIGS. 5 and 6 are wiring diagrams of respective portions of an instruction matrix;

FIG. 7 is a diagram showing portions of a table of the binary states of the flip-flops of the instruction register for various processor commands;

FIG. 8 is a table showing the binary states of the flip-flops of the counter register with an intermediate portion removed in the interest of conciseness;

FIG. 9 is a detailed wiring diagram of a portion of the cores of the program control array;

FIG. 10 is a diagram of step operations controlled by exemplary cores of the core array, illustrating operations blocks common to all processor commands and operations blocks specific to one or another of two specific commands;

FIG. 14 is an amplified detail of a portion of the diagram of FIG. 10 showing exemplary operations to be performed during certain operations blocks, and the logical equations corresponding to the operations indicated;

FIG. 15 is a detailed circuit diagram of a typical flip-flop used in a preferred embodiment of apparatus according to this invention;

FIG. 22 is a circuit diagram of flip-flops designated K1 and K2, and associated input circuits;

FIG. 23 is a circuit diagram of flip-flops herein designated WS1–WS6, and associated input circuits, several of the flip-flops and input circuits having been broken out in the interest of conciseness;

FIG. 25 is a circuit diagram of flip-flops designated L13 and L14 with respective input circuits;

FIG. 26 is a circuit diagram of flip-flops designated A1–A12, with associated input circuits, several of the flip-flops and circuits having been broken out in the interest of conciseness;

FIG. 27 is a circuit diagram of flip-flops designated A13 and A14, with respective input circuits; and FIG. 28 is a table indicating the numbers of control circuits rendered active during certain respective ones of the operations blocks of FIG. 10, for the decision control of the counter and instruction registers.

Figure 1:
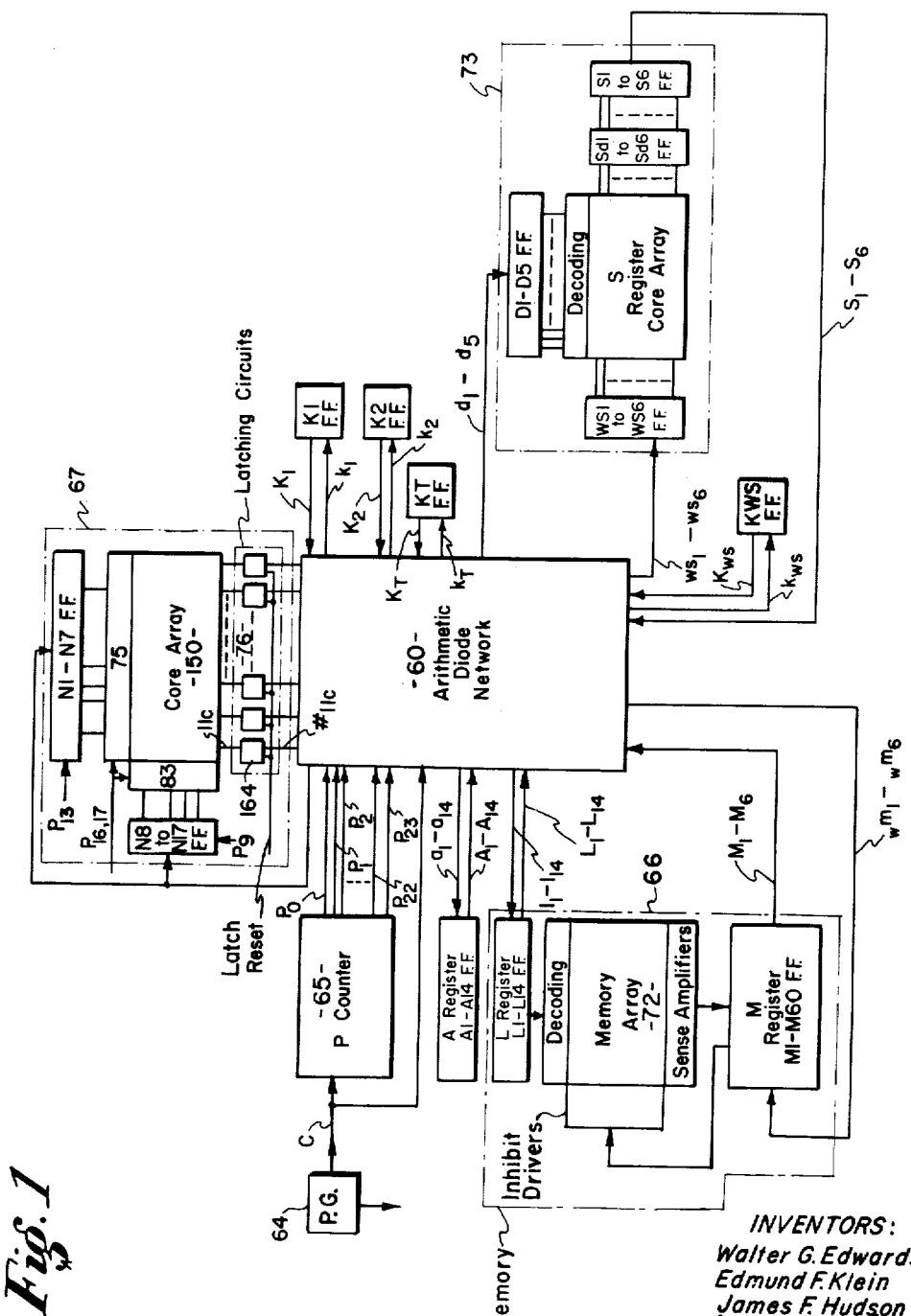
FIG. 1 is a schematic diagram showing a portion of components of a data processing system controlled by the program control apparatus of this invention.

Referring to FIGS. 1 and 3, schematic block diagrams are shown of a portion of the components of a data processing system adapted to be controlled by the program control system of this invention. As shown in FIG. 1, the computer comprises a transfer and arithmetic diode network 60 which serves, inter alia, to interconnect the computer memory 66, several registers, including A, L, M, and S registers, counting means such as basic operating cycle counter 65, and a program control device 67 forming a principal part of this invention.

The memory 66, which is exemplary of the type employed in the data processing system in which the control apparatus of the present invention is adapted to function, may be comprised of 60 planes of cores, a plane for each bit of a 60-bit word. The combination of all corresponding bit positions in the planes comprises a cell of the memory for storing a word. After a cell is properly selected by an address in the L register, the information in the cell is read out of the memory, during portion $P_{20}$–$P_{23}$ of the basic operating cycle (see FIG. 2), and set up, in parallel, in the 60 flip-flops comprising the M register, such that the least significant binary digit is set up in flip-flop M1 and the most significant binary digit is set up in flip-flop M60. This is accomplished by connecting a sense line passing through each of the cores of a plane of the memory via a sense amplifier to the inut of a corresponding flip-flop of the M register. Associated with the M register is a shifting network which successively shifts information within the register and out of the first character position (six bits comprise a character) thereof such that each character can be operated upon in series during the respective one of the intervals $P_0$–$P_9$, for example, of the operating cycle. After the logical operation portion of a cycle has been performed during portion $P_{23}$–$P_{10}$ of the basic operating cycle, the 60-bit word in the M register is then transferred, in parallel, during periods $P_{11}$–$P_{13}$ back to its originating cell location in the memory via an inhibit driver provided for each of the 60 planes. In general, operation of each core memory plane of the present computer is according to known principles such as are explained, as for example, in patent application Serial No. 616,439, Howes et al., filed October 17, 1956.

The S register system 73 shown in the exemplary system associated with the present invention is comprised of a core array and associated circuitry especially adapted to shift the characters of a word stored therein relative to the pulse periods of the basic operating cycle. Thus the S register is provided with a column select counter comprised of flip-flops D1 to D5 which is employed for shifting the position of characters as written into and read from the S register with respect to the shifting of characters out of the M register, which latter is done in a fixed order relative to certin pulse periods of the basic operating cycle. The circuits and operation of the S register is according to principles such as are explained for example in patent application Serial No. 660,796, Edwards et al., filed May 22, 1957.

Arithmetic diode network 60 is controlled by the program control device indicated generally by 67, and is timed by P counter 65 which continually counts pulses received from clock pulse source 64. As previously noted P counter 65 defines the basic operating cycle of the machine. Program control device 67 comprises a bistable-magnetic-core array 150, individual cores of which are in general selected and driven one at a time according to the output configurations of flip-flops N1–N7 and N8–N17. These two groups of flip-flops operate through respective decoding matrices 75 and 83. Sense lines, such as the one designated 11c, form and carry the outputs (sense signals) of core array 150 in a manner previously indicated and hereinafter more fully described. Each sense line is connected as an input to a respective one of a series of bistable latching circuits, hereinafter termed latches, of which that designated 164 is exemplary. The output line of any latch, such as the output line designated #11c, forms a control line for energization of a respective assigned set or sets of one or more logical networks comprised in diode network 60. Flip-flops N1–N17 are "set" or filled from memory device or array 72 via diode network 60 at a prescribed period of each operating cycle; and are also controlled in instances by action of a pair of decision flip-flops K1 and K2, in a manner and for a purpose hereinafter explained.

Program control device 67 controls the activity or operations performed during successive operation intervals of the computer by selecting sets of logical networks within diode network 60 for transferring data between the computer memory and the registers, for carrying out logical operations on the data during each operations block of the sequence, and other purposes hereinafter explained.

Figure 2:
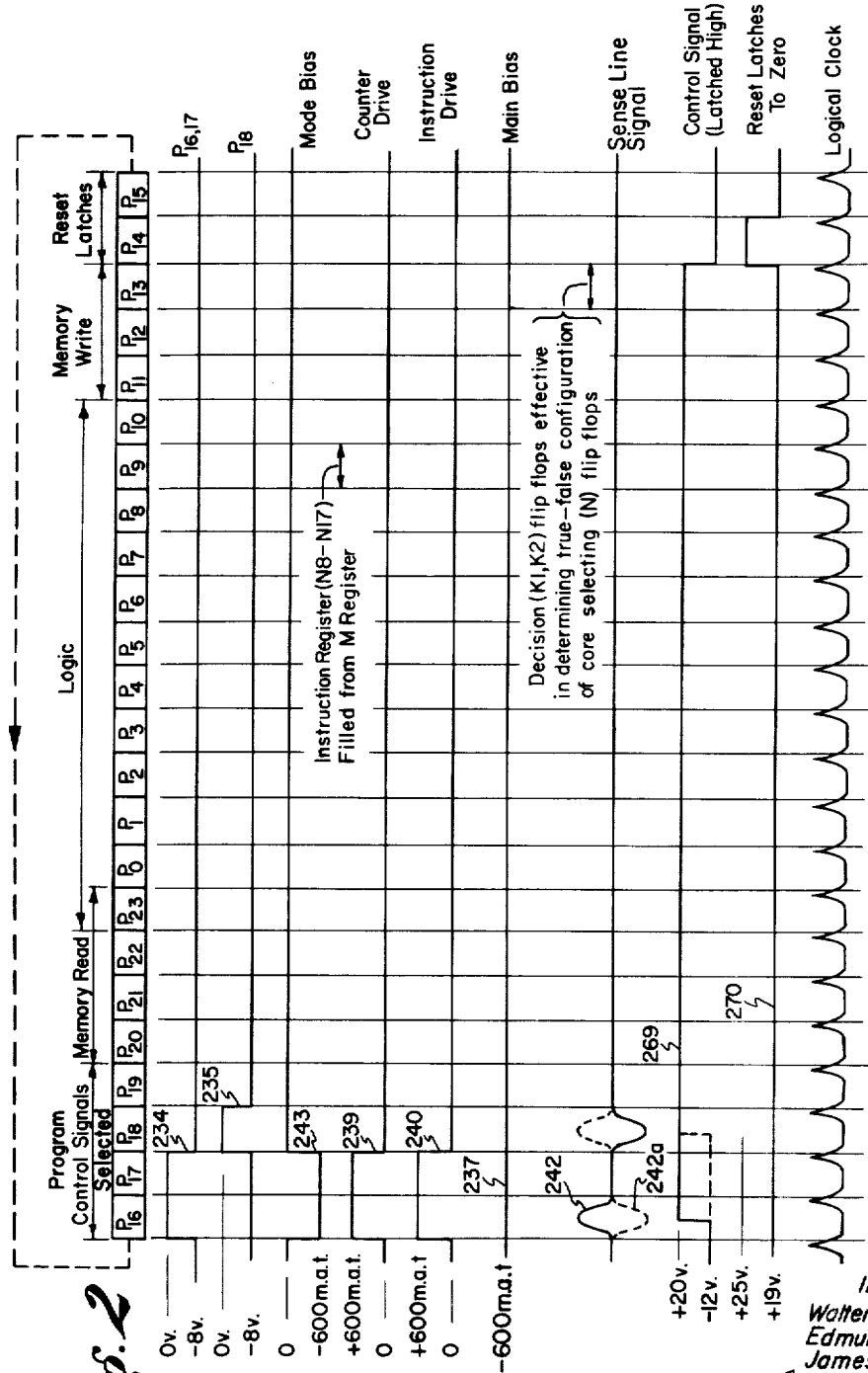
FIG. 2 is a diagram of the computer basic operating cycle showing waveforms to explain the operation of the program control apparatus.

Referring now to FIG. 2, there is schematically portrayed a diagram representing the aforementioned exemplary basic operating cycle, and including exemplary waveforms used in explaining the operation of the program control system. The exemplary basic operating cycle defines a cyclically repetitive series of operations that are run through or performed once for each program operations block. The cycle is divided into a fixed number (twenty-four) of equal intervals or periods which are counted off by P counter 65 under control of and synchronously with the computer clock pulses received from source 64. The periods thus demarked are for convenience numbered $P_0$ to $P_{23}$, inclusive; and counter output lines and respective output line signals, one for each period, are similarly designated $P_0$ ... $P_{23}$. For convenience, the basic operating cycle is considered to commence with period $P_{16}$. During each cycle the output line signals or pulses of P counter 65 control the moving of data from one register to another, in accordance with the requirements of logical operations performed in arithmetic diode network 60. During periods $P_{16}$ to $P_{19}$, inclusive, the program control signals are formed, i.e., the program control core assigned to the currently effective operations block is selected and the proper control circuits are brought to "high" potential state by setting up of the corresponding latches, such as latch 164. During periods $P_{20}$ to $P_{23}$, inclusive, the computer memory 66 is read; and during periods $P_{23}$ to $P_{10}$, inclusive, logical operations are performed in diode network 60. During periods $P_{11}$ to $P_{13}$, inclusive, the computer memory 66 is written into; and during periods $P_{14}$ and $P_{15}$, the latches such as latch 164 are reset. The program control signals produced as a result of setting up latches at the beginning of each cycle, i.e., during periods $P_{16}$ to $P_{19}$, inclusive, energize respective sets of logical circuits within diode network 60 during the remainder of that computer basic operating cycle, after which the latches are reset. As indicated in FIG. 1, P counter 65 has output lines $P_0$, $P_1$, $P_2$ ... $P_{22}$ and $P_{23}$, one for each count or period of the computer basic operating cycle, upon which lines respective count signals are provided by the counter. For example, a signal of 0 volts, indicated at 235 on waveform $P_{18}$ (FIG. 2) appears on the line $P_{18}$ during period $P_{18}$. Similarly designated signals appear on the other P lines at correspondingly designated periods. A signal indicated at 234 on waveform $P_{16,17}$ is formed during periods $P_{16,17}$ in a logical sum circuit (not shown) from the signals provided on lines $P_{16}$ and $P_{17}$. This combined signal controls decoding matrices 75 and 83 each of which is interposed between a respective group of the N flip-flops and the core array 150, as indicated in FIG. 1.

Referring now to FIG. 3, a block diagram of the program control device shown enclosed in dot-dash line 67 of FIG. 1 is depicted. The device as illustrated comprises the core array 150 in which a plurality of bistable magnetic cores are indicated as being arranged in rows and columns. The core indicated at 151 is exemplary. In general, row drive lines (such as that indicated by 168) and column drive lines (such as that indicated by 169) are inductively linked with the cores of respective rows and columns, one row drive line per row of cores and one column drive line per column of cores. Selection of a specific row from among all the rows of cores is controlled by instruction register flip-flops N8–N10, N11–N13, special selection register flip-flops N15—N16, and counter register flip-flop N7. Selection of a specific column of cores is controlled by counter register flip-flops N1–N4 and N5—N6. The outputs of flip-flops N11 to N13 pass through an instruction matrix 152 where they are decoded to select one of eight groups, row group 1 to row group 8, of the core row drive lines. The outputs of flip-flops N8 to N10 pass through an instruction matrix 153 where they are decoded to select drivers from among a group of instruction drivers 154, each of the latter being connected to one drive line in each of the eight groups row group 1 to row group 8. The decoding actions are hereinafter explained in detail. Thus, by concurrent action of flip-flops N8–N10 and of flip-flops N11–N13, a single row drive line (for example, line 168) passing through a row of cores may be selected from among all of the row drive lines and connected in a circuit for pulsing. For selection of a specific column drive line the outputs of counter flip-flops N5 and N6 pass through a counter matrix 160 where they are decoded to select a driver from among counter drivers 161, each of the latter being connected to a respective one of four groups (column Group 1 to column Group 4) of column drive lines. The outputs of counter flip-flops N1 to N4 pass through a counter matrix 162 where they are decoded to select one column drive line of each of the four groups of column drive lines. Thus by concurrent action of flip-flops N5, N6, and flip-flops N1–N4, a single column drive line is selected from among all the column drive lines. Therefore, during period $P_{16,17}$ of the basic operating cycle (FIG. 2) a current pulse is passed through the selected row drive line by a selected one of instruction drivers 154, and a contemporaneous current pulse is passed through the selected column drive line by a selected one of counter drivers 161, resulting in a particular core being selected and driven (reversed in state). These operations will hereinafter be explained in greater detail. Diodes, such as that indicated at 176 in FIG. 4, are connected as indicated to prevent current leakage through non-selected lines.

As previously indicated, each core of the array has linked therewith a set of one or more sense lines, such as that indicated at 11c in FIG. 3. Change to state of the selected core induces a signal (indicated by waveform 242 or 242a in FIG. 2) in each sense line linking the core. As hereinbefore indicated, each sense line drives a respective individual latching circuit, such as 64 (FIG. 1). Each latching circuit (latch) has an output line, such as that designated #11c. In an exemplary operations block in which exemplary core 151 is selected, a signal is induced in sense line 11c which triggers or sets up latch 164. This causes a signal of +20 volts to appear on control line #11c, as indicated by 269 in FIG. 2. This signal is applied to a set of one or more of the network units of arithmetic diode network 60 (FIG. 1). It should be noted that if more than one set of logical networks were required for operations in the operations block represented by exemplary core 151 each of such sets would be controlled by a respective latch and each such latch would be connected to receive and be set up by a signal on a respective sense line inductively linked to core 151. Thereby, the proper latches would be set up to render active the required sets of logical networks. It is thus made evident that selection and reversing of the state of a core causes the proper set of one or more program control signals to be formed to render desired logical networks operable. This will hereinafter be explained in greater detail.

Referring again to FIG. 3, a main bias line 170 is provided upon which a current of sufficient amplitude is maintained to return any selected core to its initial state at the end of the timing period $P_{17}$ when the driving current pulses through the row and column drive lines fall to zero. The main bias line is inductively linked to all of the cores of the array. Flip-flops N15 and N16 are used for special selection of rows as will hereinafter be explained. A mode bias circuit 173 (FIG. 12) controlled by flip-flops N14 and N17 provides, as required, a bias current through certain portions of core array 150 by way of bias lines 171 and 172, respectively, from −8 volt terminal 155, for selection of a single core from among a core in a row and a core in a sub-row. In order for the counter flip-flops N1–N7 to be controlled by the computer logic to either select columns in orderly sequence or to skip, decision flip-flops K1 and K2 are connected through decision logic network 174 to provide controlling inputs to counter flip-flops N1 to N7. In general, after filling or setting the instruction flip-flops N8 through N13 from the M register (FIG. 1), during $P_9$, to select a core array row, columns are normally selected in succession in increasing numerical order whereby, normally, cores within that row are selected in succession and pulsed as the counter counts. Decision flip-flops K1 and K2 may, under controls hereinafter explained in detail, interrupt this orderly sequential selection of columns and cause skipping (jumping) of columns, or sticking (repeating) action.

FIG. 4 depicts a circuit diagram of the row and column drive lines of the program control device core array 150. As illustrated in magnified area 149 of the array, the cores, such as core 158, are arranged to form rows and columns. The column drive lines (of which line 169 is typical) are divided into groups designated as indicated at the upper end of the figure, with all the lines of a given group connected to a respective group lead through individual diodes. Similarly, as indicated at the lower end of the figure, the first line of each group is connected to a common drive lead; similarly, with the second line of each group; and so on. The row drive lines (of which line 168 is typical) are somewhat similarly divided into groups as indicated at the right of the figure; and in general but with exceptions as indicated, the row drive lines of a group are connected to a common group drive lead. As indicated at the left of FIG. 4, the first row drive line in each group is connected to a common lead, similarly with the second line of each group, the third, and so on, with the exception that in certain groups certain of the row drive lines have associated therewith and connected thereto (by way of respective diodes) "sub-row" drive lines. For example, in row group 8, the first (uppermost) drive lead of the group has connected therewith, by way of an individual diode, a sub-row lead. The sub-row leads are not connected to a common group lead at the right of the diagram, but form separate leads as indicated. The cores are for convenience designated each by a row address and a column address. The columns addresses proceed from 00 designating the extreme left-hand column, through 01, 02, etc., through 39 using decimal numeral designation. Due to the division of the rows into groups of eight principal rows each, the row addresses are by octal designation, commencing with 00 at the uppermost row, and continuing through 01, 02 . . . 06, 07, 10, 11 . . . 17, 20, 21, 22, etc., but allowing for sub-designation for sub-row. As an example of the latter, in row group 3, row 26 has associated therewith three sub-rows, and the row designations are modified to read 26(0), 26(2), 26(4), and 26(6), as shown. According to this system, the address of the first core of the first row (00) and the first column (00) would be designated 00–00, that of the first row, second column similarly designated 00–01, and so forth. The cores of row 00 may be reserved as spares or for other reasons, and normally not employed; and since the first two cores are common to all commands, only one core is necessary in each of the first and second columns. To avoid necessity of linking all row drive lines through those two cores, and for other evident reasons, they are not linked to any row drive lines and are driven through double column drive windings as indicated and hereinafter explained. Accordingly these cores lack a row designation and are designated −−00 and −−01, respectively.

FIG. 5 depicts a wiring diagram of instruction matrix 152 of FIG. 3. This register acts to select one row group from among the eight core array row groups 1 to 8, in response to the outputs of flip-flops N11 to N13 (FIG. 3). Referring also to FIG. 7, which shows the binary states of the instruction register (flip-flops N8 through N17) for various computer commands, the selection of one row group from among row groups 1 to 8 will be explained. Preliminary to explanation of details of row and column drive line selection, construction and operation of a typical flip-flop will be explained. For this purpose instruction register flip-flop N1 is selected; and it should be noted that the other N register flip-flops are substantially identical. Referring to FIG. 15, flip-flop N1 is provided with true and false input signals $n_1$ and $_0n_1$ on respective true and false input lines 278 and 279, for triggering the flip-flop into the true or false state, respectively. Thus, whenever input $n_1$ or $_0n_1$ is high in potential, a clock signal C is gated by way of gates 280 and 281 to the true or false trigger inputs, respectively. As shown, gate 281 comprises a junction 285 connected to false input line 279 by way of a resistor 286. Junction 285 is impressed with a positive clock signal C (FIG. 2) only when there is a high potential $_0n_1$ on line 279. Inverter gate 289 provides a means for triggering flip-flop N1 to the false state as a function of the true input signal $n_1$ on line 278. Inverter gate 289 comprises p-n-p transistor 290, the emitter of which is connected to timing line 291 and the base of which is connected to line 278 impressed with input signal $n_1$. The collector of transistor 290 is connected to −8 volt terminal 292 by way of resistor 293. Transistor 290 is biased to conduct only when signal $n_1$ on line 278 is low in potential and the timing signal on line 291 is high in potential, causing current to pass from line 291 to −8 volt terminal 292 by way of resistor 293, to result in the signal $_0n_1$ on line 279 being high in potential. Thus flip-flop N1 is triggered to a false state. It can now be seen that when timing line 291 is at a high potential, a high potential on line 278 causes flip-flop N1 to be triggered to the true state, and a low potential on line 278 causes it to be triggered to the false state. When either a low potential signal is on line 291 or a high potential signal is on line 278, flip-flop N1 cannot be triggered to the false state. When timing line 291 is at a high potential, flip-flop N1 is triggered in response to the single signal $n_1$ on line 278. Thus, only timing logic is required to provide a signal on timing line 291, while the logical networks for transferring data from other registers are only required to provide a signal on line 278. Returning now to consideration of FIGS. 5 and 7, the eight possible combinations of the outputs of flip-flops N11, N12, N13, with binary designations from 000 to 111, are assigned to and serve for selection of respective ones of row groups 1 to 8. For example, row group 1 is selected when flip-flops N11 to N13 are all in their false state (binary notation 000). In this exemplary selection of row group 1, p-n-p transistors 177, 178, and 179 (FIG. 5) are biased into a conductive state by flip-flop outputs $N_{11}'$, $N_{12}'$, and $N_{13}'$ being at a high potential (ground potential, for example). It is to be noted that the two logical potential levels used in the exemplary apparatus according to the invention are selected to be ground potential (high) and −8 volts (low). In selection of row group 1, current passes from the row group 1 line through transistors 177, 178, and 179 to −4 volt terminal 184 providing transistor 185 is biased into conduction by timing signal $P_{13}'$ being high, as it is during period $P_{16,17}$. Signal $P_{18}'$ is the inverse of signal $P_{18}$ shown having a signal waveform 235 in FIG. 2. Thus row group 1 is selected when all of flip-flops N11, N12, and N13 are in their false states.

Certain of the rows among row groups 3, 7, and 8 are selectable by operation of flip-flops N15 and N16 according to what is herein termed command modes, whereby there may be selected different minor variations of the command selected or determined by flip-flops N8 to N13 (FIG. 3). This use of a command mode for minor command variations has the advantage that it reduces the number of basic commands required and simplifies the computer basic command list shown in part in FIG. 7. As an illustration, and referring to FIG. 5, row group 3 of the row drive lines is selected when flip-flop outputs $N_{11}'$, $N_{12}$, and $N_{13}'$ are high in potential and bias transistors 180, 181, and 179, respectively, to a conductive state. For mode selection within row group 3, mode selection flip-flops N15 and N16 determine, for example, which of four row drive lines 26(0), 26(2), 26(4), and 26(6) of the "miscellaneous test command" defined by row 26, is to be selected. Further illustrating this example of mode selection, if flip-flops N15 and N16 are in their true state, outputs $N_{15}$ and $N_{16}$ are at a high logical potential causing the potential on line 182 to rise from a normal −8 volts to a −4 volts potential. In that case, transistor 183 is biased into conduction, current flowing through line 26(6) and each of transistors 183, 180, 181, 179, and 185, providing signal $P_{18}'$ is high as before. Thus line 26(6) is selected from the sub-set including 26(0) . . . 26(6) which was selected by instruction matrix 153 (FIG. 3). In this way either of four variations of the miscellaneous test command represented by row 26 is available and selectable, according to the command mode stored in flip-flops N15 and N16.

In certain instances computer commands are such that more than forty counts (basic operating cycles) are required for completion or definition of the command. In such instances, a row and a sub-row of cores are used, one after the other, to accommodate the long command. This provides a maximum of eighty operating cycles for the long command; but as in the case of other commands, not all of the cores (cycles) need be used. Selective inhibition of one and then another from among the row and sub-row, for selection of first one and then the other of the two, is accomplished by operation of flip-flop N7 (FIG. 3) of the counter register. As an example, row 44(40), (FIG. 4) provides an extension of row 44(0) for the "merge" command. Flip-flop N7 selects for driving, first the principal row 44(0), and then sub-row 44(40), by inhibiting first one and then the other of the two rows of cores. This use of an additional row of cores to continue the count for commands which require more than 40 computer basic operating cycles has an advantage in that it simplifies and reduces the number of components in the counter matrix 160, counter matrix 162, and counter drivers 161 (FIG. 3), and greatly reduces the number of column drive lines.

FIG. 6 presents a wiring diagram of instruction matrix 153 and instruction drivers 154 shown on the block control diagram in FIG. 3. Referring also to the table of FIG. 7, each binary combination out ouputs of flip-flops N8 to N10 selects one row in each of the eight groups of rows of cores. For selection of the first row of each group, for example, flip-flops N8, N9, and N10 are all triggered to the false state. For this, n-p-n transistors 186, 187, and 188 of FIG. 6 must be biased into a conducting state, and are so biased by providing $N_{10}'$, $N_9'$, and $N_8'$ at the high logical voltage of ground potential. As indicated in the tabluation in FIG. 7 and the circuitry of FIG. 6, each combination of outputs from flip-flops N8, N9, and N10, thus biases a particular one of the transistors of group 154. For example, when n-p-n transistor 189 (lower left; FIG. 6) is biased to conductive state as signal $P_{16,17}$ rises to a high level (indicated at 234 in FIG. 2), current flows from the +12 volts source (upper right; FIG. 6), through transistors 188, 187, 186, and 189 to −50 volts terminal 192. The −8 volts potential provided through clamping diode 193 is applied through the now conductive transistor 189 to p-n-p transistor 190, rendering the latter conductive. Thus current may flow from the +20 volts terminal 191, through inductor 200, through transistor 190, and through the first rows driver lead to the first row of the particular group of rows that has concurrently been selected by operation of flip-flops N11–N13. This current pulse continues during P counter periods $P_{16,17}$. At the end of periods $P_{16,17}$, when P counter signal $P_{16,17}$ falls to a low potential, transistor 189 is biased out of conduction; and at the same time dummy driver transistors 197 and 198 which are of the n-p-n type are biased into conduction by signals $(P_{16,17})'$ going to a high potential, thus permitting current to continue to flow from terminal 191 through inductor 200. When signal $P_{16,17}$ again goes to a high potential to pass a current pulse through a selected core drive lead (FIG. 4), the action of inductor 200 resisting changes of current causes the current pulse through the rows of cores to have a fast rise time in opposition to the tendency of the cores to resist a change of state. Line 201, which is connected to a +12 volt terminal, normally biases the base of each of the instruction driver transistors of unit 154 to prevent emitter-to-collector leakage when the transistors are non-selected.

Referring now to FIG. 8, which shows a partial table of the states of the counter flip-flops N1–N7, and also to FIG. 3, selection of a column drive line will be explained. As was previously indicated, the outputs of flip-flop N7, where required, select one row and then the other from two for operations during decimal counts from 00 to 79 in a two-row command. It is to be noted that the commands are described in octal numbers to correspond with the octal designations of the respective rows of the core array. The physical circuits of counter matrix 160 and counter drivers 161 and counter matrix 162 (which serve to select a specific column drive line at a respective count) are similar to those for selection of a specific row drive line, and accordingly will not be described in detail.

Referring now to FIG. 9, a detailed circuit diagram is shown of an exemplary portion of the cores of the program control core array depicted schematically as unit 150 in FIGS. 3 and 4. Referring also to FIG. 10, an exemplary portion of a sequential "flow diagram" or operations block diagram is depicted for illustrating typical sequential step or block operations within two different commands and including those operations controlled by exemplary cores illustrated in detail in FIG. 9. Each of the operations blocks shown in FIG. 10 has an operations block number by which it is identified and which number corresponds to the numerical designation of the control array core which controls the computer operations represented by that block. For example, core 03–02 (FIG. 9) controls the operations represented by operations block 03–02 of FIG. 10. As will hereinafter be made clearly evident in greater detail, each operations block represents, in the operations sense, a set of logical equations which define the portions of the arithmetic diode network 60 which are to be effective during the periods of $P_{23}$–$P_{10}$ of the particular computer basic operating cycle effective for that block. While carrying out the step operation represented by a given operations block of the flow diagram, the next core to be effective in operations control is selected by operations of the N and K flip-flops as governed by operation in diode network 60; and the selected core is driven during periods $P_{16,17}$ at the beginning of the following computer basic operating cycle (FIG. ). Thus the order in which the operations blocks are performed by the computer is automatically self-sequencing. As hereinbefore indicated, the specific operations which are represented by a particular operations block and are carried out in predetermined order during one basic operating cycle, may be repeated in each of one or more basic operating cycles, depending on a binary decision formed in the computer networks and brought into effect by the true and/or false states of the decision flip-flops K1, K2. An example of this choice in response to logical operations is indicated at operations block 03–11 in FIG. 10, wherein, as indicated, the computer may in normal action count to the next operations block, or skip (for example, to block 03–13), or stick, i.e., repeat the operations of block 03–11, as determined by the results of operations within the arithmetic diode network and placed in effect through decision flip-flops K1, K2. Another choice which is determined within a given command is that at certain counts, a choice between two alternative operations blocks (for example, between blocks 03–16 and 03–16–1) may be made by the true-false status of one of mode flip-flops N14 and N17. This choice may, for example, cause the sequence of operations during that step to be controlled by a core of a sub-row rather than the corresponding core of the principal row, as previously explained. Thus it is evident that logical decisions made by the computer while performing the steps defined by the counts of a command may determine the actual "flow path" followed during computer operation.

In general, a computer command is represented by a respective principal row of cores of array 150. Hence the term "command level" is applied to each of the principal rows of the cores. The first two operations blocks in all commands are the same, as hereinbefore indicated, and are designated, as are the two corresponding cores, – – 00 and – – 01, respectively. The double column (vertical) windings of each of these cores is indicated at the upper left of FIG. 9. It will be noted that these two cores are not linked by any row (horizontal) drive lines, as are the other cores shown in FIG. 9. As indicated in FIG. 7, the "add" command is assigned, in the exemplary apparatus, to row 01, while the "subtract" command is assigned to row 02, "multiply" to row 03, etc. The cores shown in detail in FIG. 9 are, except for the two cores – – 00 and – – 01 common to all commands, cores of rows 03. The sequence of operations carried out in the "03" row of exemplary operations blocks indicated in FIG. 10 will now be briefly described. During blocks – – 00, – – 01 (which are common to all commands) and extending through 03–02 and 03–03 of the "multiply" command, command words are looked up, as indicated in FIG. 10. During blocks 03–04 through 03–06, the computer prepares to look up the multiplier, and then extracts and stores the multiplier. In blocks 03–07 and 03–08, the multiplicand is extracted and stored, and in block 03–09 the multiplier is copied into the S register. In block 03–10, the tally register is filled with the first multiplier digit and in blocks 03–11 and 03–12 the multiplicand is accumulated and the tally register is filled with the next multiplier digit. In blocks 03–13 through 03–15, the least significant digit to be put away is determined. Then a no-round-off in block 03–16, or a round-off in block 03–16–1, is executed, depending on the state of the mode bias as determined by flip-flop N14. After preparing for putaway in blocks 03–17 and 03–18 the product is started on its putaway path in block 03–19 or 03–19–1 depending on the state of the mode bias as determined by flip-flop N17. The remainder of putaway is carried out in blocks 03–20 or 03–20–1 and 03–21–1 also depending on the content of flip-flop N17.

Continuing with the descriptions of exemplary commands as illustrated by FIG. 10, the operations in the blocks for the divide integer command (row 04) are well known and will not be explained in detail except to note that lookup is also commenced in blocks – – 00 and – – 01 and carried to completion in blocks 04–02 and 04–03.

As hereinbefore indicated, for performance of the operations represented by the respective operations blocks, the corresponding cores of the program control array are selected and driven, one for each computer basic operating cycle.

Figure 11:
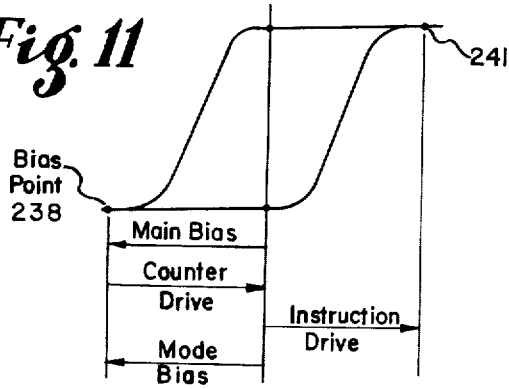
FIG. 11 is a diagram of the hysteresis characteristic of the material of the preferred type of magnetic cores utilized in the core matrix depicted in FIG. 4, with indications of the relative magnitudes of core controlling coercive effects.

Passing now to FIG. 11, which is a diagram of the hysteresis characteristic of a preferred type of magnetic cores utilized in the core matrix, and referring also to the waveforms of FIG. 2, the action of the cores during selection and driving will be explained. All cores of the array are normally under the influence of a main bias current which continuously flows through respective windings on each one of the cores and is of such magnitude as to provide a coercive effect of, for example, 600 milliampere turns on each core. The windings, bias current, and cores are selected so that the coercive effect of the bias current will, when not opposed, always return all of the cores to a chosen one of the two magnetic states. In general, but with exceptions such as those previously noted, the counter (column) driving current and the instruction (row) driving current are passed through respective coils on cores, and these coils and the respective driving currents are chosen so that in each instance the coercive force produced by any one of the two is equal and opposite in sign to that of the main bias current. Hence either driving current alone would be sufficient to turn over a core in the absence of the effect of the main bias current, but would merely nullify the effect of the latter and not turn over the core in the presence of the main bias current. And similarly, coincidence of both driving currents in opposition to the effect of the main bias current would cause (a) nullification of the effect of the main bias current and (b) turn-over of the core to the opposite state. Also, upon disappearance of the two driving currents, the core would be reversely turned over to the original state by the unopposed main bias current. The directions and relative magnetomotive forces of the three currents are indicated in FIG. 11 by the labeled arrow tipped lines. From examination of the figure it may readily be noted that if a mode bias current is passed through a coil on a core, with the winding and current of direction and magnitude such as to equal the effect of the main bias, it may be employed to nullify the effect of one of the two coincident column and row driving currents and thereby prevent the latter from reversing the state of the core. When row drive line 24 and column drive line 16, for example, are coincidentally pulsed in opposition to the main bias, core 24–16 is selected. Thus, at the beginning of period $P_{16}$ in operations block 24–16, an instruction driving pulse of magnitude to produce an effect of 600 milliampere turns, as indicated by waveform 240, is passed through row drive line 24, and a counter driving pulse of similar effect as indicated by waveform 239 is passed through column drive line 16. As the core is thus driven, a signal of one or the other of waveforms 242 and 242a (FIG. 2) appears on each of the sense lines linked to core 24–16. Which of the voltage signals (242 or 242a) is produced in a particular sense line depends upon the direction of the winding of the sense line through the core. At the end of period $P_{17}$, the two driving currents fall to zero value and the main bias current returns the core to the magnetic state indicated by the bias point 238 in FIG. 11. This second "turnover" or reversal of state of the core induces another set of signals in the sense lines linked to the core, as indicated in period $P_{18}$ on the sense line signal waveform of FIG. 2. As will hereinafter be explained, only the positive signals on the sense lines are used to trigger, (i.e., to energize or set-up) the latching circuits. As is evident from examination of the sense line signal waveform in FIG. 2, each sense line linked to the core will have induced therein a positive and a negative pulse, irrespective of the direction of the winding, and as will hereinafter be made apparent, it is immaterial whether the positive pulse is produced in period $P_{16}$ and the negative pulse in $P_{18}$, or vice versa. Operation of a mode bias circuit to alter this normal core driving procedure will next be explained.

Figure 12:
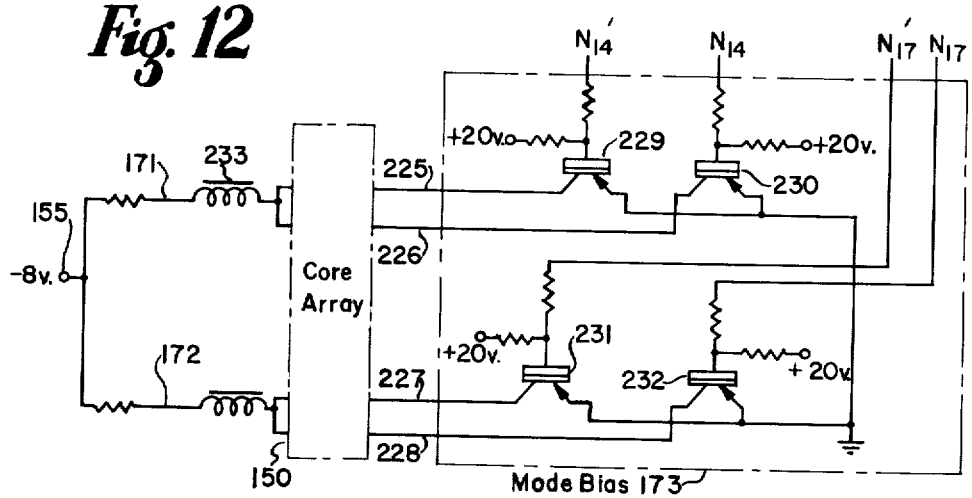
FIG. 12 is a circuit diagram of the mode bias circuit used in selecting a core from among a row and a sub-row of cores of the program control array.

The operation of the mode bias circuit indicated at 173 in FIG. 3 will now be explained in detail. The alternative selection of core 03–16 in the routine of the multiply command, or of sub-row core 03–16–1 representing a sub-routine in the multiply command, will be used as an example. These cores are shown in FIG. 9. As indicated in FIG. 11 and as previously explained, the driving force of the mode bias current is equal to that of the counter drive, which is of the same driving value as the instruction drive; but the mode bias current is negative, that is, provides magnetization effort opposite that of the instruction and counter drives. The examplary mode bias current, depicted by waveform 243, is of −600 milliamperes turns coercive effect; and while passing through a core prevents that core from being driven to point 241 of the magnetization curve by the row and column drive currents. FIG. 12 shows a circuit diagram of the mode bias circuit indicated at 173 in FIG. 3. As noted in the previous discussion of the selection of row drive lines, mode flip-flops N14 and N17 allow selection of either one of two cores situated in the same column, one core of the two being in a row and the other in a sub-row and both of which would for that reason receive a row drive pulse at the same time. The selection is accomplished by biasing the undesired one of the two with the mode bias current so it will not be driven to its opposite state by the coincidence of instruction and counter driving pulses through the respective selected row and column drive lines. As illustrated by example in FIG. 9, a particular row drive line may pass through not only the cores of its row but also the cores of an associated sub-row. As there depicted, the exemplary row 03 drive line 168a passes through all of cores 03–02, 03–03, 03–04 . . . 03–20, and also passes through sub-row cores 03–16–1, 03–19–1, 03–20–1, and 03–21–1. It will be noted that certain of the column driving lines pass through both a row core and sub-row core situated in the same column. For example, the column 16 drive line 169a passes through core 03–16 and sub-row core 03–16–1. Hence both the respective counter drive and instruction drive pulses pass simultaneously through both a row core and a sub-row core of a column. Referring specifically to FIG. 12, when flip-flop N14 is in its true state, output $N_{14}$ is at a high potential and output $N_{14}'$ is at a low potential which causes p-n-p driver transistor 229 to be biased into conduction to pass current through mode bias lead 225 and the undesired cores of core array 150 and through inductor 233 to −8 volt terminal 155. At the same time p-n-p driver transistor 230 is biased out of conduction so that no current flows through mode bias lead 226 to oppose the effect of the row drive current through the desired core. Similarly, when it is desired to select the core through which mode bias lead 225 passes, flip-flop N14 is biased into its false state, output $N_{14}$ is at a low potential and $N_{14}'$ is at a high potential, inducing transistor 230 to conduct mode bias current through mode bias lead 226 and through the proper cores of array 150 to −8 volt terminal 155. At the same time transistor 229 is biased out of conduction and prevented from conducting a mode bias current pulse through line 225. Since current is always passing through one or the other of lines 225 and 226, a constant current passes through inductance 233 which characteristically acts to resist change of current, thus providing a fast rise time for the mode bias current pulse through the selected mode bias lead and undesired core. Outputs $N_{17}'$ and $N_{17}$ of flip-flop N17 control p-n-p type driver transistors 231 and 232 to selectively pass a current pulse through one or the other of lines 227 and 228. This mode bias controlled by flip-flop N17 is similar to the mode bias controlled by flip-flop N14 previously described. Referring to FIG. 10, it is noted that operations block 03–16 (controlled by core 03–16) has the legend N14=0 applied thereto; and that block 03–16–1 (controlled by the companion sub-row core 03–16–1) has the legend N14=1 applied thereto. These legends are employed to indicate that core 03–16 (and hence operations block 03–16) is selected when flip-flop N14 is set false (0), and that companion sub-row core 03–16–1 (and hence operations block 03–16–1) is selected when flip-flop N14 is set true (1).

Figure 13:
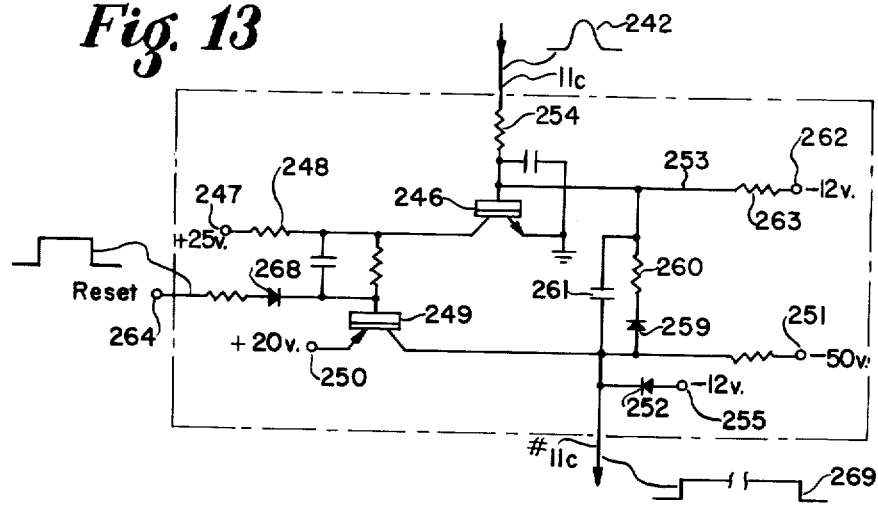
FIG. 13 is a circuit diagram of a typical latching circuit.

Now that the selection of control array cores as exemplified in FIG. 9 has been explained, the arrangement of the sense lines through the cores, and the connections of the sense lines to trigger or set up latching circuits, will be explained; it being noted that latches are normally set up and released or reset, in ordinary instances, once for each basic operation cycle. FIG. 13 is a circuit diagram of a typical one of the latching circuits, such as that one indicated at 164 in FIG. 3. The circuit of the latch comprises n-p-n transistor 246 and p-n-p transistor 249. Transistor 246 has its base connected to exemplary sense line 11c by way of resistor 254, its collector connected to +25 volt terminal 247 by way of resistor 248, and its emitter connected to ground as indicated. Transistor 249 has its base connected to the collector of transistor 246 by way of a base resistor, its emitter connected to +20 volt terminal 250 and its collector connected to program control line #11c. Line #11c, which provides a "high" diode network control signal when latch 164 is set up, is also connected to −50 volt terminal 251, and is clamped at −12 volts potential through clamping diode 252 which is connected to −12 volts terminal 255. Line #11c is also connected to the base of transistor 246 by way of diode 259, resistor 260 and parallel capacitor 261. The base of transistor 246 is also connected through line 253 to −12 volt terminal 262 by way of resistor 263. Latch reset terminal 264 is connected to the anode of diode 268, the cathode of the diode being connected to the base of transistor 249 to bias the latter to non-conductance upon arrival of a reset signal at the reset terminal.

Continuing with explanation of latching circuit operation, when a positive signal appears on the sense line 11c due to turn-over of a core to which the sense line is linked, transistor 246 is triggered to conduct current from +25 volt terminal 247 through resistor 248 to ground. This causes lowering of the potential on the base of transistor 249, thus causing the latter to conduct, the current flowing from +20 volt terminal 250 through the transistor and diode 259, resistor 260, resistor 254, and through the sense line to ground at the end of the sense line. This current feedback through resistor 254 maintains a high potential on the base of transistor 246 after the voltage signal of waveform 242 falls. Thus, during the time interval from $P_{16}$ (or $P_{18}$) through $P_{13}$, the +20 volt potential of terminal 250 is impressed upon the program control line #11c as a program control signal. This is indicated by the high potential of waveform 269 (FIG. 2). This high potential program control signal, designated #11c, is maintained until a reset signal of +25 volt potential, as shown at $P_{14}$ on waveform 270, is applied to terminal 264. The 25 volt reset signal is impressed through diode 268 onto the base of transistor 249 which is thereby biased out of conduction. The back bias of approximately 5 volts causes the carriers to be quickly removed from transistor 249. As a consequence, the potential on program control line #11c falls sharply toward the −50 volts of terminal 251, and is clamped at the −12 volts potential of terminal 255 as diode 252 is biased into forward conduction, thus terminating the control signal at the beginning of period $P_{14}$. This is indicated on waveform 269 of FIG. 2. As diode 259 is back biased, the −12 volts of terminal 262 is impressed on the base of transistor 246, returning the latter to normal non-conductive state. Current passing through the voltage divider from ground at the end of sense line 11c, and through resistors 254 and 253 to −12 volt terminal 262, maintains the base of transistor 246 at a desired bias. Diode 259 prevents the clamped potential on control line #11c from affecting the bias on the base of transistor 246. It is to be noted that each latching circuit is connected to and activated by a respective separate sense line, and each latching circuit is connected to energize a respective individual diode network control line. As will hereinafter become evident, the output potential on a control line when the corresponding latch is set up, is used as driving potential in logical circuitry in the diode network 60, whereby the circuitry produces "true" output when all of the input terms are high. Alternatively, the output potential on a control line may itself be used as one of the input terms in logical circuitry, whereby when both the control potential and all of the other input terms are high, the circuitry will provide a "true" output.

By operation of the computer clock and counter, the counter drive and instruction drive pulses fall to zero value at the end of period $P_{17}$. Thus, during period $P_{18}$, the selected core is returned to normal bias point 238 (FIG. 11) by the main bias. If a sense line is wound through the selected core, signals such as 242 or 242a appear on the sense line and a latching circuit (such as 164) is set up during period $P_{18}$. This is indicated by waveform 269, FIG. 2. The action of the control potential produced on a control line such as #11c, to control an arithmetic operation (and specifically in this example to control the product circuits of the logical networks) will hereinafter be explained.

Referring now to FIGS. 9, 10, and 14, operations of the system in performing exemplary operations controlled by specific control-array cores will be explained. In FIG. 14 there are shown in amplified form certain of the operations blocks of FIG. 10, with the exemplary logical equations to be carried out during each of the indicated blocks. The rectangles representing the operations blocks are enlarged, and within each of the blocks concise statements appear which define exemplary operations or activity during that respective computer basic operating cycle. Below each of the blocks, exemplary logical equations are presented which define how the statements made within the rectangle are stated in terms of the computer operations to be carried out in arithmetic diode network 60.

It can be noted that certain forms of the logical equations occur in more than one of the exemplary operations blocks. Arithmetic diode network 60 comprises diode circuitry for physically generating each equation shown. In the prior art it is well known how the arrangement of the circuitry for generating each equation can be set up directly for each instance the equation is employed. However, it is not necessary for a logical combination of terms to be generated more than once. When a particular equation is used in several operations blocks, it is only necessary to provide circuitry for generating this equation once, and then to select the diode network circuit for this particular equation whenever it is required to be rendered operable, by setting the latch which controls the diode network in question. This multiple use of portions of the diode network reduces the number of components required in the computer.

In block −−00, the first of two blocks which are common to all commands, and which is brought into effect by driving core −−01 through a double winding with only the column drive line pulse, the control number is looked up. In that block, control signals #41c, #42c, #45c, #46c, #54c, #57c, and #36c are required to render operable the input diode networks for the L1 to L14 flip-flops, A1 to A14 flip-flops, K1 and K2 decision flip-flops, and KT timing flip-flop. Accordingly, as indicated in FIG. 9, core −−00 is wound with sense lines 41c, 42c, 45c, 46c, 54c, 57c, and 36c. It is to be noted that a number followed by lower case letter c, as for example 41c, indicates a sense line; and the corresponding notation, as for example #41c, indicates the corresponding diode network control line and signal out of the latching circuit connected to and controlled by sense line 41c. Other sense lines wound through core −−00 are noted to be sense lines 12c and 13c, which are used, together with sense line 36c, already provided for, to control the N flip-flops for the skip decision by way of control lines #12c, #13c, and #36c, respectively, as will hereinafter be explained (see FIG. 28). Thus, during the computer basic operating cycle when core −−00 is selected and driven to its opposite state, respective sense signals appear on sense lines 41c, 42c, 45c, 46c, 54c, 57c, 36c, 12c and 13c, respectively, and set up the corresponding latches whereby control lines #41c, #42c, #45c, #46c, #54c, #57c, #36c, #12c, and #13c are each brought to and remain at high potential from period $P_{18}$ through the following $P_{13}$ period of the basic cycle. The diode networks representing the logical equations listed under operations block −−00 of FIG. 14, and to carry out the possible skip to block 71–06, are contained as sets of networks in diode network 60 and are rendered operable by energization of the listed control lines when the respective latches are set up.

In the second operations block, −−01, a different set of logical networks must be rendered operable as indicated by the corresponding set of equations below block −−01 in FIG. 14. Sense lines 50c, 51c, 52c, 53c, 32c, and 59c are wound through core −−01, so when that core is selected and driven to its opposite state, control signal lines #50c, #51c, #52c, #53c, #32c, and #59c are set at a high potential as a consequence of the corresponding latches being set up. The required logical circuits are thus made active. Similarly, in block 03-02, a third set of logical networks, as indicated by the logical equation below the block, is required to be effective, and they are rendered operable by control signals #69c, #70c, #33c, #32c, #56c, and #13c (FIG. 28) resulting from the corresponding latches being set up by the appropriate sense lines 69c, 70c, 33c, 32c, 56c, and 13c linked to core 03-02. The inputs to flip-flops A1 to A8, as here noted, must be rendered operable for shifting data transferred from the M register to inputs to flip-flops A1–A14, which also must be rendered operable. Also the inputs to flip-flops N14–N17 must be rendered operable to transfer the mode bits from the M register. It should here be noted that the logical equations and operations performed in the illustrative operations blocks are exemplary and do not include all of the possible operations actually accomplished in those blocks.

Some of the equations that are effective in block 03-04 are also effective in other blocks. The equation therein for $1_{1-4}$ and $1_{5-8}$ are similar to the equations in block – – 00, and the equations for $a_{1-4}$ and $a_{5-8}$ are similar to those in block 03-02. Accordingly, as indicated in FIG. 9, sense line 41c is wound through both of cores – – 00 and 03-04, and sense line 69c is wound through both of cores 03-02 and 03-04. Sense lines 85c and 87c also are wound through core 03-04 to render effective the equations to fill A9–A14 from the S register.

Referring now to FIGS. 16, 17, 18, and 19, block diagrams and input circuits of the several flip-flops N1–N17, are depicted as an aid in explanation of the operation of these core drive line selecting registers in conjunction with action of decision flip-flops K1 and K2, to perform such operations as skip, jump, and count. The foregoing description makes it evident that the particular sets of diode circuits necessary for accomplishing the desired results within any particular operations block are rendered active by control signals produced on corresponding respective control lines in response to the setting up or energizing of the respective latching circuits, one of the latter for each set of diode arithmetic circuits required; and that those latching circuits are set up in response to respective sense signals created in respective sense lines in response to reversals of state of a single control array core through which those particular sense lines extend. Hence it is clear that each control array core is assigned the control of operations to be performed in the computer within the basic operating cycle run through in a respective individual control operations block, and that if one or more particular sets of diode networks are to be activated in each of a plurality of operations blocks, their associated latch-triggering sense lines will thread through and be linked with each of the several cores to which are assigned respective ones of that plurality of operations blocks. Also equally clear are the facts that a given core may have a set of more than one sense lines linked thereto whereby that core may control set-up of more than one latching circuit, and that any given latch may have its triggering sense line extending through each of a plurality of control array cores whereby the said given latch may be set up by selection of any one of those cores. Accordingly, it is evident that since any particular core of the control array has linked thereto the respective sense lines of only certain ones of the latching circuits, each core (and its assigned operations block) is unique and functionally distinct from others of the cores. The latches illustrated in FIG. 9 are exemplary only, and it should be noted that the computer may and normally does, comprise several hundred of such circuits. A computer command is assigned a respective row of cores in the array (with the previously indicated exceptions in which a command may be assigned two rows of cores) and hence, in general, a row of cores may be termed a "command level." While a command is thus assigned at least one row of cores, it is not required that all of the cores of the row be utilized, since a command may not require all forty of the available operations blocks (cores).

The generally sequential "counting" or selection of cores one after another (one selection for each basic operating cycle of the computer) is effected, as previously indicated, by action of counter flip-flops N1–N7. Since in certain instances all of the cores of two rows may be included in a single command, the counter flip-flops must be capable of making eighty different selections (two rows of forty cores each) from 00 through 79. Referring to FIG. 8, it is evident that different true-false combinations of column selection flip-flops N1–N7 can readily accommodate the required eighty different necessary selections. As therein indicated, if the false condition of any and all flip-flops is assigned a selection value of zero, and the true condition of a flip-flop is assigned a value according to the parenthetical values indicated at the upper end of FIG. 8, the count number of any core (and its corresponding operations block) can be represented by combinations of the true and false states of the seven flip-flops indicated in the list in FIG. 8.

As was previously herein indicated, operational variations from sequential selection of the cores in a row comprise "skipping" and "sticking," the latter term being applied to repeating the operations defined by an operations block. Skipping and/or sticking are operations not called for in most operations blocks, that is, they are called for in only a minority of the operations blocks. The skipping and sticking are under control of the decision flip-flops K1 and K2, the latter in turn calling for a skip or a stick only in response to requirement therefor as evidenced by the result of computations or other operations of the diode network of the computer, and in each case only in response to setting up of one of a particular set of latching circuits. If one of the required latches is not set up, the computer can only perform straight-forward counting. FIG. 7 is a table, with parts broken out to leave only exemplary portions, indicating which of the row (command level) selecting flip-flops N8–N13 must be in the high (1) state for selection of a given one of the exemplary command levels. FIG. 8 is a similar table, indicating which of the column (count) flip-flops N1–N7 must be in the high state for selection of a given operations block (core) within a command level. At the end of any particular basic operating cycle preparations must necessarily have been made for the selection of the signals controlling the operations of the next operating cycle. Accordingly, during period $P_{13}$, prior to commencement of the next cycle at $P_{16}$, flip-flops K1 and K2 are consulted or interrogated for an indication as to whether the same operations block is to be repeated by a "stick" decision, or a count to the next succeeding operations block made, or a skip to some other operations block effected, and the N flip-flops are at that period set for the coming core selection at $P_{16,17}$. Thereafter, during $P_{14}$, and $P_{15}$, all the previously set latches are released, prior to new latch setting operations when the newly selected core is driven or "pulsed" in periods $P_{16,17}$.

Figure 16:
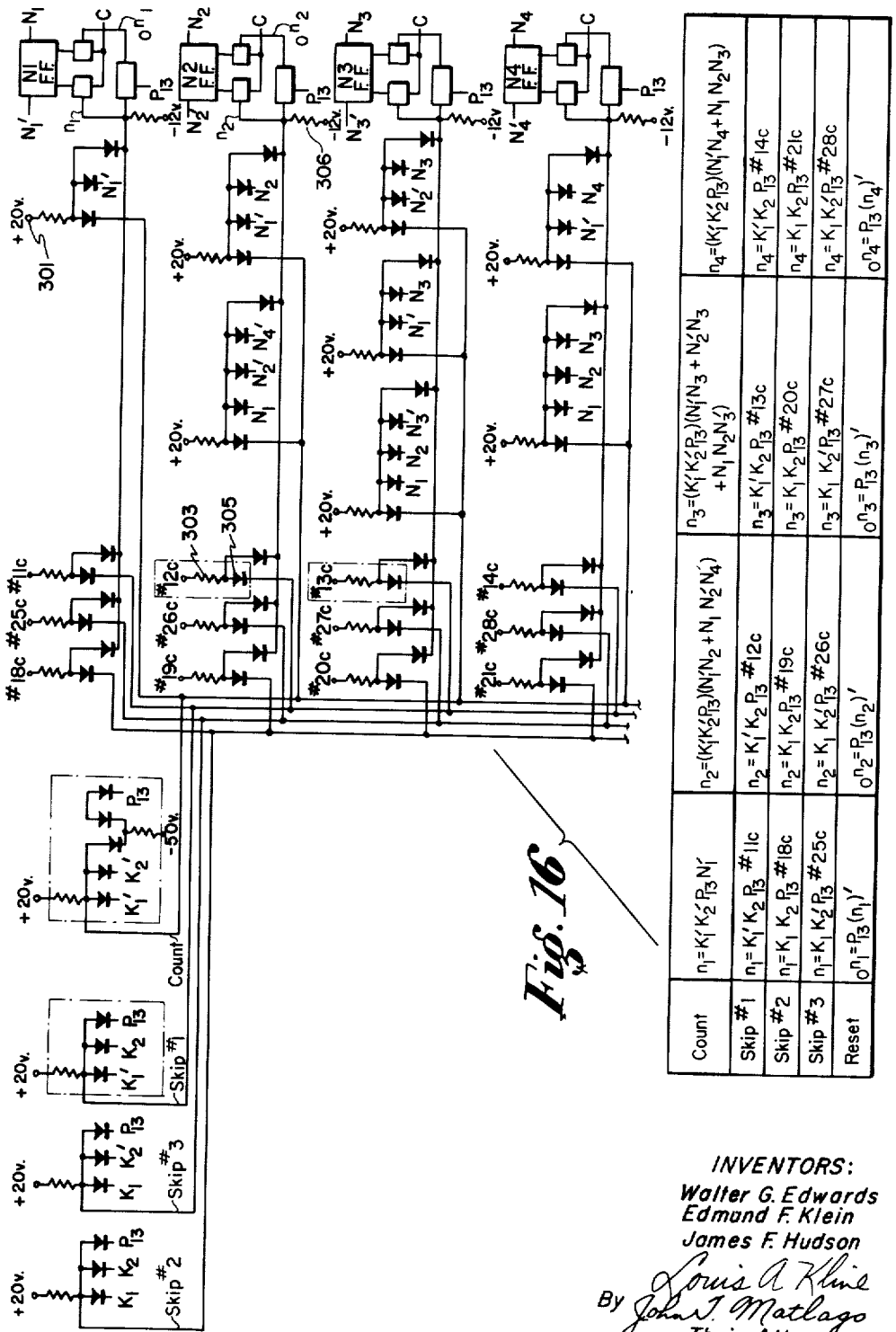
FIG. 16 is a schematic diagram of flip-flops herein designated N1–N4, with associated input circuits and a tabulation of logical equations describing the input circuits.
Figure 17:
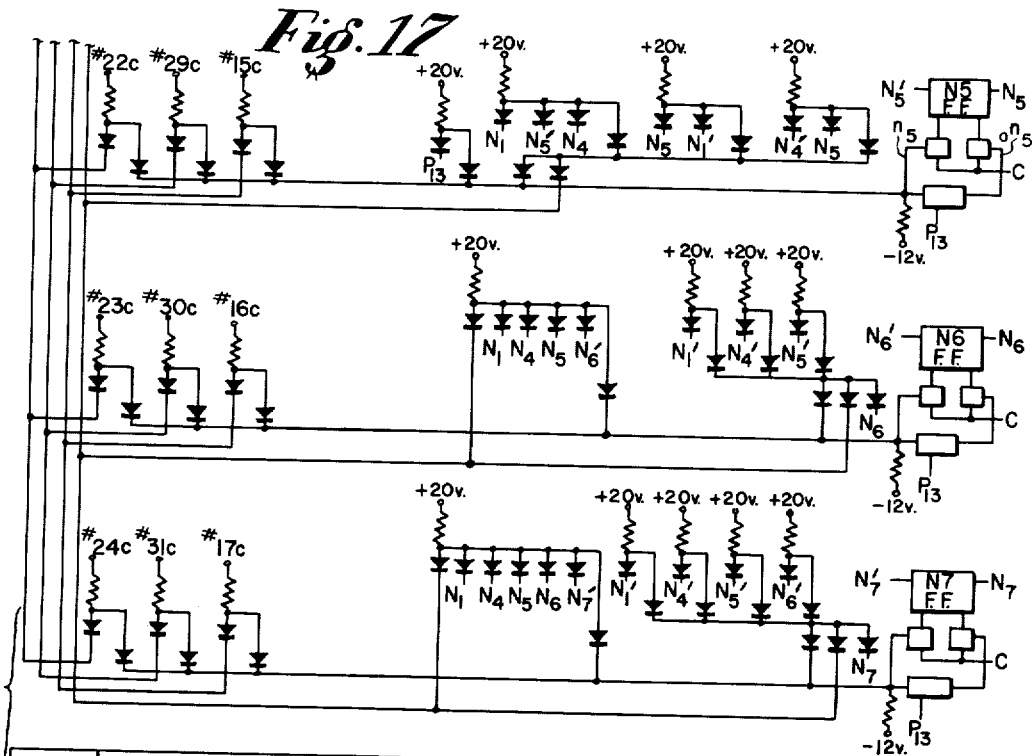
FIG. 17 is a schematic diagram of flip-flops herein designated N5–N7, with associated input circuits and a tabulation of logical equations describing the input circuits.

Turning first to the input networks and logical equations for the counting flip-flops N1–N7 as set out on FIGS. 16 and 17, an exemplary step from one operations block to another within the same command may be explained. As previously indicated, the core representing an operations block is driven (pulsed by the row and column drive pulses), during the $P_{16,17}$ period. The N1–N7 flip-flops are required to be in the proper states at that time, and as noted they are brought to the required states during period $P_{13}$ when the decision flip-flops K1 and K2 are consulted for information as to what operations block is next to be effective. Hence it is seen that if a given one of flip-flops N1–N7 is required to be in state 1 (as indicated in the table of FIG. 8), its input circuitry (FIGS. 16 and 17) must have applied thereto a certain configuration of input signals to bring it to that state. For example, if flip-flop N1 must be in the 1 state (as it must for each of counts 01, 03, 05, 07, 09, 11, 13 . . . 77, and 79), one or another of the four input signal configurations defined by the logical equations for $n_1$ in the table in FIG. 16 must be provided. Otherwise, N1 flip-flop will be brought to 0 (false) state by application of the $_0n_1$ (reset) signal at $P_{13}$ if it is not already in that state. The four possible configurations of "true" or high input signals to the N1 flip-flop to render that flip-flop true are represented by the logical equations labeled Count, Skip #1, Skip #2, and Skip #3, in FIG. 16. Giving consideration to the given equations for the four possible input signal configurations which may cause N1 to be true, it is noted that for the "Count," i.e., passing to the next succeeding operations block, the equation requires that both of K1 and K2 flip-flops be false, that is ($K_1'K_2'$). For Skip #1, the K flip-flops must be: ($K_1'K_2'$); and so on. Thus it is evident that the four possible states of the two K flip-flops govern the matter of whether a "count" or a "skip" or a "stick" (a skip back to the beginning of the same operations block) will be effected. Since the setting of all the core-selecting N flip-flops preparatory to start of the next operations block is effected during period $P_{13}$, the P counter signal $P_{13}$, as well as the outputs of the K1 and K2 flip-flops configuration, must be supplied as an input signal into each of the N1–N7 flip-flop input circuits. This is accomplished by the circuitry indicated in FIGS. 16 and 17. As is evident from the input circuits there shown, each includes an input line connected to receive either of three different latch circuit output (control) signals, such as #18c, #25c, #11c in the case of the circuit for flip-flop N1. Thus there are required twenty-one latching circuit output signals, three assigned to and for each respective one of the N1–N7 flip-flops. These signals are supplied to respective input diode circuits of the N1–N7 flip-flops; and at period $P_{13}$ of the basic operating cycle one or the other of the three supplied to a given input circuit contributes, unless both of the K flip-flops are false, to bringing the respective N flip-flop to the 1 (true) state to form a part of an N flip-flop configuration effecting a particular skip. If both $K_1$ and $K_2$ are false, a skip cannot be consummated; and in that event a straightforward "count" or advance to the next operations block is effected, as indicated by the equations for "Count" in FIGS. 16 and 17.

From the preceding it is evident that the configuration of the K flip-flops at period $P_{13}$ will govern which one of skip, count, or stick procedures is to be followed in selection of the next active operations block. The particular column from which the next active core is to be chosen is determined by the configuration of the N1–N7 flip-flops; and in a similar manner, and by operationally comparable circuits and equations, the N8–N11 flip-flops determine the row in which the next-to-be active core is located. The circuits for the latter flip-flops are set out in FIG. 18, and the pertinent logical equations are set out in the table below the circuits. From the latter it will be noted that a skip from one row (command) to another is possible only when the K2 flip-flop is true at period $P_{13}$ with the latch circuit for output #36c set up; that is, with control signal #36c "high."

Flip-flops N8 through N13 are filled (set) from the memory in operations block – – 01, as shown by the equations in FIG. 14. Flip-flops N14 through N17 are filled from the memory in, for example, blocks 03–02, 04–02, and other blocks as may be required in the commands.

Figure 18:
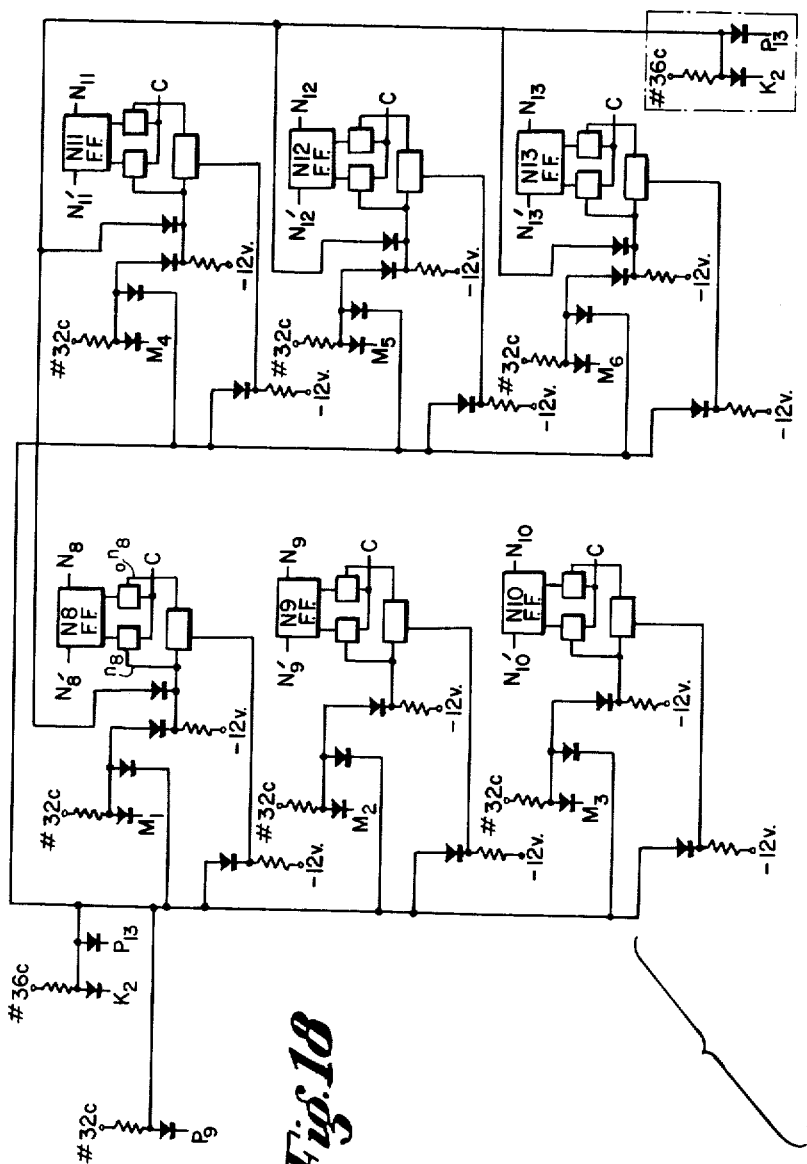
FIG. 18 is a schematic diagram of flip-flops herein designated N8–N13 and associated input circuits, and a tabulation of logical equations describing the input circuits.

Not only will the counter skip to different operations blocks within a command as hereinabove described, but the instruction register will allow skipping to a different row (command level) in response to the decision output of flip-flops K1 and K2. For example, block – – 00, as indicated in FIG. 14, requires a skip to block 71–05 (Skip #1) when flip-flop K1 is false and K2 is true. This will be treated as an exemplary skip in command level in the following detailed explanation of operations. The command level call-out for selection of row 71 must be made in flip-flops N8 through N13, and flip-flops N1 through N7 must be set for count 06. As indicated in FIG. 8, for the count of 06, flip-flops N2 and N3 must be set true and N1, N4, N5, N6, and N7 set false, by the procedure previously discussed. As indicated in the binary table of FIG. 7, to select command row 71, flip-flops N8, N11, N12, and N13 must be set true and N9 and N10 set false. Accordingly, the illustrative equations and input circuits in FIG. 18 show that with control line #36c energized, flip-flops N8 through N13 are triggered to select the command row 71 when K2 is true at period $P_{13}$. This is near the end of the computer basic operating cycle during which the operations of block – – 00 are carried out. Thus during $P_{16}$ and $P_{17}$ of the following computer basic operating cycle, core 71–06 of the control array is selected and driven to set the diode networks for the operations of block 71–06.

From the preceding discussion, it is evident that before a core is selected and driven, i.e., at $P_{13}$ of the previous computer operating cycle, both the counter register and instruction register may be changed in response to the contents of decision flip-flops K1 and K2.

In a table in FIG. 28 there are listed control signals that must be high (true) during exemplary ones of the computer operations blocks. As there indicated, in operations block – – 00 which is common to all commands, control signals #12c, #13c, and #36c must be high. They are so set by the respective latches when core – – 00 is turned over during $P_{16}$ or $P_{18}$. Now noting that in the skip operation selected as exemplary, that is, a skip to 71–06 from – – 00, the decision flip-flops have been brought to the ($K_1'K_2$) state as indicated in block – – 00 of FIG. 14. This, as indicated in the circuitry in FIG. 16, permits the Skip #1 decision output line to come to a high state at the next $P_{13}$ period. Since control line #12c is high, input line $n_2$ to flip-flop N2 will be brought to high state at $P_{13}$, making the N2 flip-flop true. This is evident since control signal #12c is applied through product resistor 303 as one input in the logical product circuit comprising (a) the Skip #1 logical product circuit of the decision network and (b) the #12c control signal input circuit. The active N2 flip-flop input circuit is represented in the "Skip #1" row of the tabulation in FIG. 16, in the $n_2$ input column. In the exemplary skip, it is also required that flip-flop N3 must be true (for the "06" count); and since control signal #13c is also high, a product circuit similar to that described for flip-flop N2 is made high at $P_{13}$. The logical equation is listed in the $n_3$ input column opposite "Skip #1" in the table of FIG. 16. Since neither of the control lines assigned to flip-flops N1, N4, N5, N6, and N7 have been brought to the high (true) state by turnover of core – – 00, none of those flip-flops can at this operating cycle be made true; and each is brought to the false state (if not already false) at $P_{13}$ period by application of the $P_{13}$ count signal to the $_0n$ input lines of those flip-flops. This is indicated in the respective flip-flop circuits of FIGS. 16 and 17, and in the "Reset" equations for those flip-flops in the tables of FIGS. 16 and 17.

Continuing with explanation of the operations in the exemplary skip (to 71–06 from block – – 00), it was noted that the configuratiton required in the N8 to N13 row selecting flip-flops was N8, N11, N12, and N13 true with N9 and N10 false. The input circuitry for these flip-flops is shown in FIG. 18 and the applicable input equations are shown in the upper line of the table in FIG. 18. It will be recalled from the table in FIG. 28 that control line #36c was among those brought to a high state when core – – 00 was turned over. It is evident from the circuit diagram in FIG. 18 that the signal from control line #36c is applied, when both $K_2$ and $P_{13}$ are high, directly to the "true" input side of each of N8, N11, N12, and N13, but not directly to the true input side of N9 nor N10. Each of the N8–N13 flip-flops has applied to the emitter of the p-n-p transistor in its inverter gate circuit (see FIG. 15 for inverter circuit details), two signals, one being #32c control signal at period $P_9$ and not of interest in this exemplary operation, and the other being $K_2P_{13}\#36c$. The latter signal is effective to render flip-flops N9 and N10 false since those two do not have high true input signals at $P_{13}$. The signal ($K_2P_{13}\#36c$) applied to the inverters of flip-flops N8, N11, N12, and N13 is there of no effect, however, since the concurrent high signal ($K_2P_{13}\#36c$) applied to the "true" input circuits of those flip-flops render the respective inverter gate transistors non-conductive. This is evident from consideration of FIG. 15 whereby it may be noted that the "true" input signal is also applied, by way of junction 278, to the base of the p-n-p transistor 290. Thus it is seen that flip-flops N2, N3, N8, N11, N12, and N13 will at $P_{13}$ be set in true state, while the remainder of flip-flops N1–N13 will be set false, with the result that at $P_{16,17}$ of the next cycle, core 71–06 will be turned over and the operations assigned to that block performed.

In the preceding paragraph it has been explained how the computer proceeds from one set of operations to another by selective driving of control array cores. The exemplary operations-shift from block – – 00 to block 71–06 is, of course, only one of the possible continuations for which the control apparatus provides, as is evident from the exemplary tasks listed in block – – 00 of FIG. 14. As there noted, if the K1 and K2 flip-flops are both false, the apparatus "counts," that is, merely proceeds with operations assigned to block – – 01. Alternatively, one or the other of skips, #2 and #3, could be effected, depending upon the true-false states of the K1–K2 flip-flops. While in the specific exemplary operations described the only sense lines linked to core – – 00 that were used were 12c, 13c, and 36c, it is evident that the others of the set of sense lines linked to that core are similarly used for other operations performed in block – – 00. Hence it is seen that the operations set out in the exemplary operations blocks shown in FIG. 14 are themselves only exemplary, and that the system is very flexible in the matter of assigning and performing operations under or within any operations block.

To illustrate how control over the core-selecting N flip-flops may be exercised by other than the – – 00 operations block core, additional input circuits and corresponding equations for flip-flops N8 through N13 are shown in FIG. 18 and will be explained, it being understood that similar additional inputs and equations are applicable to other N flip-flops. Block – – 01, also common to all commands, is chosen as an example for this purpose. It will be understood that a counting operation in the preceding block (– – 00), called for by the setting of both of the K1–K2 decision flip-flops to the false state, will have preceded driving of core – – 01 to institute operations in block – – 01. Some exemplary operations called for in block – – 01 are listed in that block in FIG. 14. There, in the logical equations listed under that block, true and false input equations for flip-flops N8–N13 are set out in condensed form. As there indicated, any one of these flip-flops may be brought to the true state, in the copying of the instruction from the M register into the instruction register, by coincident high signals from (1) a respective cell of the M register, (2) the $P_9$ period signal, and (3) high potential on control lead #32c. Also, in the absence of such coincident signals (due to the lack of a high signal from the corresponding M register cell) the particular instruction register flip-flop will be brought to the false state at $P_9$, as indicated by the "false" input line equation. Returning now to FIG. 18, the full true and false input equations for each of flip-flops N8–N13 for the exemplary operations, together with the requisite circuitry required for instrumenting the equations is shown. This circuitry comprises a product input circuit comprising a connection to control line #32c and a diode connection to the $P_9$ signal, that product circuit being connected as indicated through a common lead as an input to individual product circuits connected to the respective "true" input lines of the flip-flops. The latter product circuits include connections to #32c control line and individual diode connections to respective cells of the M register. In a fashion hereinbefore explained in connection with the operations in block – – 00, a high signal from an M register cell will, at period $P_9$, act with the #32c control line signal to bring the respective flip-flop to the true state; and a low signal from the M register will result in a low voltage on the true input line of the respective flip-flop, permitting the respective inverter to produce a high voltage on the "false" input line of the flip-flop to bring the latter to the false state. By this example it is shown how additional input circuits are added as necessary to effect desired changes in the N register flip-flop configurations for selection of the next operations block.

Figure 19:
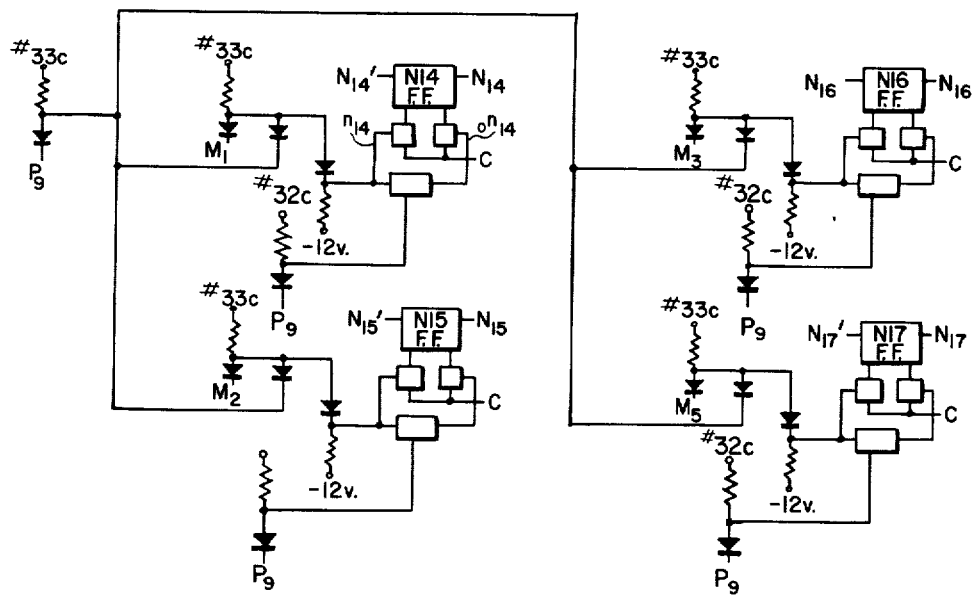
FIG. 19 is a schematic diagram of flip-flops herein designated N14–N17, and associated input circuits.

FIG. 19 depicts the input circuitry for flip-flops N14–N17 for implementing the operations defined in exemplary operations block 03–02 of FIG. 14 with respect to copy of mode data from the M register into the mentioned flip-flops. It will be recalled that the N14–N17 flip-flops control application of mode bias in row selection among the control core array. As indicated by the three condensed N flip-flop equations under block 03–02 of FIG. 14, the data is copied at period $P_9$ with control line #33c at high potential. It will be noted that N14, N15, and N16 flip-flops receive input signals from respective M register flip-flops M1, M2, and M3, while N17 flip-flop receives an input signal from flip-flop M5. In FIG. 19, the #33c and $P_9$ signals are applied through a product network to a common line serving as an input to individual product networks having respective product nets applying #33c and $M_1$, #33c and $M_2$, #33c and $M_3$, and #33c and $M_5$ signals, respectively, the four product outputs being applied to the "true" input sides of respective ones of the N14–N17 flip-flops. The functioning is substantially the same as that previously explained with respect to N1–N13 flip-flops, and accordingly will not be explained in greater detail.

Figure 20:
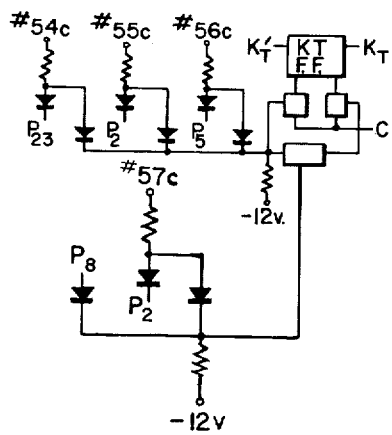
FIG. 20 is a schematic diagram of a timing flip-flop herein designated KT, and an associated input circuit.

In FIG. 20 the necessary input circuitry for the KT flip-flop to perform copying during the interval $P_{23}$ through $P_9$ is set forth, together with the logical equations for the true and false inputs to this flip-flop. The KT flip-flop has for its principal function the control of transfer of data between the A, L, and M registers. In the exemplary operations effected in blocks – – 00, 03–02, and 03–04, control by the KT flip-flop is evident from the logical equations listed below those blocks in FIG. 14. For example, in block – – 00 the copying of the address of the first word of the command is copied from M1, M2, M3, and M4 flip-flops into respective L register flip-flops L9, L10, L11, and L12 under control of the KT flip-flop and control signal #42c. Other copying operations similarly controlled by the KT flip-flop during – – 01 block are indicated in the first two lines of logical equations under block – – 01 in FIG. 14. During block 03–02 operations it is noted that transfer of data between the M and A registers, for example, is under control of the KT flip-flop.

Figure 21:
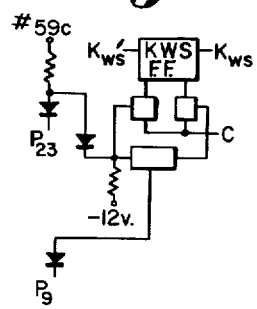
FIG. 21 is a schematic diagram of a flip-flop herein designated KWS, and an associated input circuit.

The KWS flip-flop, indicated in block diagram form with input circuitry and applicable logical equations in FIG. 21, is useful for, inter alia, controlling copying of data into the S register input flip-flops WS1–WS6 (FIG. 1) from the M register, for example. This is indicated in the sixth and seventh lines of logical equations under block – – 01 in FIG. 14. While the KT and KWS flip-flops are useful in performing other control functions in the data processing system, the examples specifically illustrated in FIGS. 20, 21, and 14 are sufficiently illustrative to indicate their utility in concurrently reducing the required total amount of diode circuitry in the computer, and increasing flexibility of control and operation of the computer.

FIG. 22 depicts in block diagram form the K1 and K2 flip-flops, and the input circuitry necessary for this register to control the skip, stick, and count functions hereinbefore described. The input circuitry is noted to be that required to implement the true and false K flip-flop input equations under blocks − − 00, − − 01, 03–02, and 03–04 in FIG. 14; and needs no further explanation in view of preceding explanations of other input circuits and equations.

The WS1–WS6 flip-flops indicated in FIG. 1 as forming an input to the S register core array, are depicted in block diagram form with appropriate exemplary input circuitry in FIG. 23. The input circuitry indicates that the first four data units are transferred into the first four WS flip-flops from the M register under control of the KWS flip-flop (FIG. 1) and control signal #52c, while the last two WS flip-flops receive the fifth and sixth data units under control of the KWS flip-flop and control signal #53c. These operations are indicated in the appropriate logical equations below block − − 01 in FIG. 14; and are exemplary of the functional operation of the KWS flip-flop.

Figure 24:
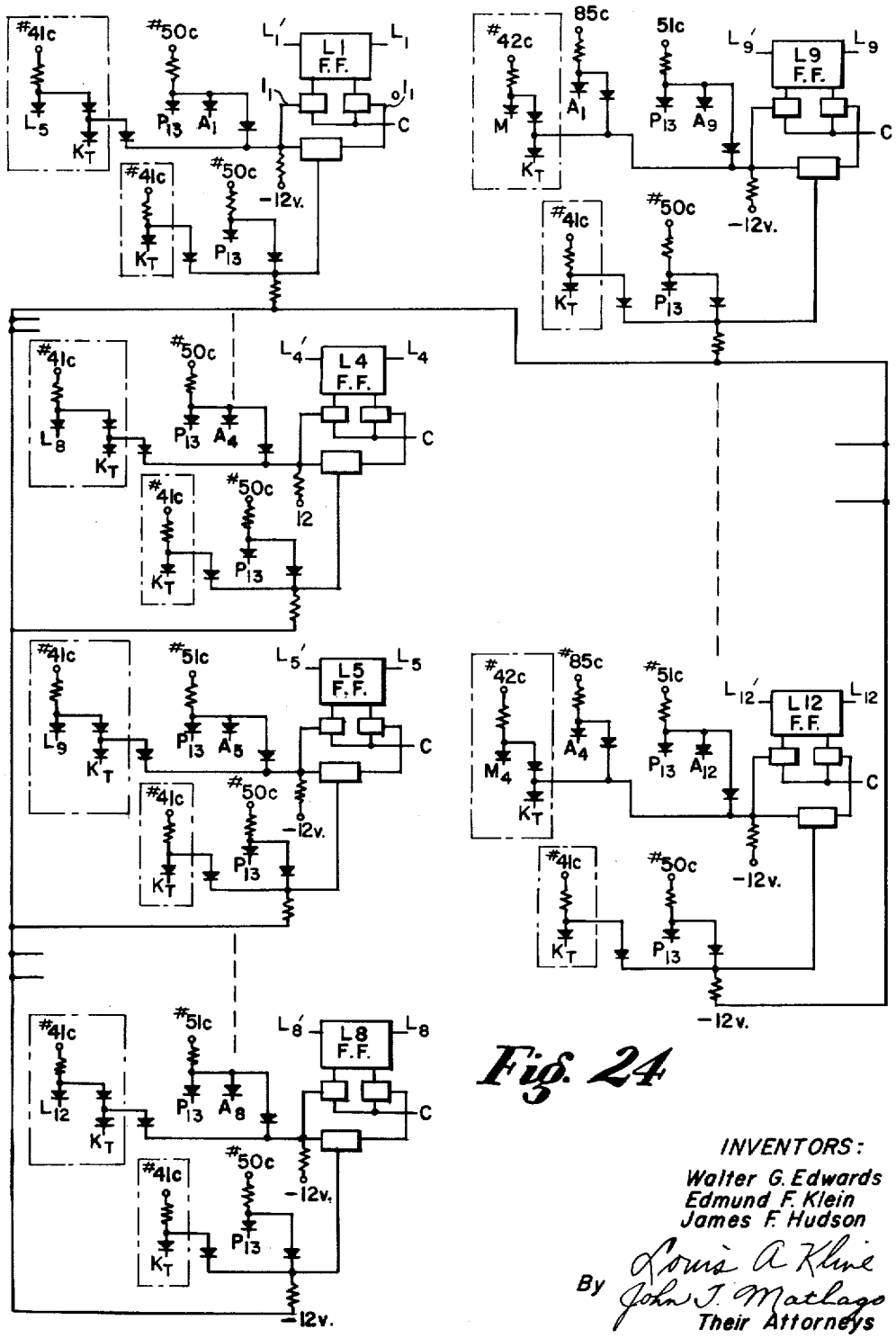
FIG. 24 is a circuit diagram of a group of flip-flops designated L1–L12, and associated input circuits, several of the flip-flops and circuits having been broken out in the interest of conciseness.

Block diagrams of illustrative ones of the L register flip-flops L1 through L12 are depicted, with associated exemplary input circuit diagrams, in FIG. 24; and the remainder of the L register flip-flops with exemplary input circuit diagrams are shown in FIG. 25. Since there is general similarity among the flip-flops and input circuits in this register, the L14 flip-flop and input circuitry will be treated as illustrative of the others. It is noted in FIG. 14 that there are exemplary logical operations involving the L14 flip-flop in each of operations blocks − − 00, − − 01, and 03–04. The corresponding logical equations are listed in the fifth and sixth lines under block − − 00, in the fourth and fifth lines under block − − 01, and in the sixth and seventh lines under block 03–04. Considering the circuitry for the L14 flip-flop in FIG. 25, it is noted that the logical product $K_T P_{2,5,8}$ is common to the first and third of the required operations. Hence this logical product is instrumented in the input circuitry of the flip-flop so as to be summed with either $M_6 \#42c$ as required in block − − 00 operations, or $A_{14} \#85c$ as required in block 03–04 operations; and the input has connected thereto by "or" (logical sum) connection, the logical product circuit $A_{14} P_{13} \#51c$ as required by operations in block − − 01. The "off" or false input equations for the L14 flip-flop include the logical product $$(1_{14})' K_T P_{2,5,8} \#41c$$

under block − − 00, the logical product $(1_{14})' P_{13} \#50c$ under block − − 01, and the logical product $$(1_{14})' K_T P_{2,5,8} \#41c$$

under block 03–04. Of these equations the first (for block − − 00) is identical to the last (for block 03–04), and accordingly is instrumented but once, as indicated at the lower left of FIG. 25. The other "off" or false input equation for flip-flop L14, namely $(1_{14})' P_3 \#50c$ is instrumented by a logical product circuit which is connected as an "or" element with the other false input circuit to the inverter gate lead of the L14 flip-flop, as indicated in FIG. 25. It should now be clear that each of the L flip-flop trigger inputs, as defined by propositions such as $1_2$, $1_3$, etc., may take a plurality of different forms, depending on the digital process to be performed. Thus note how the overall or composite equation defining the input to the L1 flip-flop as mechanized by the network in FIG. 24, may take the form $1_1 = L_5 K_T \#41c$ or the form $1_1 = A_1 P_{13} \#50c$ depending upon which of the control signals #41c or #50c is high in potential. From the preceding description, it is evident how the input circuits for the several L register flip-flops are instrumented to perform the exemplary operations pertinent to that register as set out in the operations blocks in FIG. 14 and as defined in the pertinent exemplary condensed logical equations in that figure.

FIGS. 26 and 27 are similar in format to FIGS. 24 and 25, but depict in the same fashion exemplary flip-flops of the A register (FIG. 1) and associated input circuitry which implements those portions of the exemplary operations and logical equations of FIG. 14 which pertain to the A register. Since the control, operation, and input circuit implementation of the flip-flops of this register is very similar to those features of the L register previously described in detail, further description thereof will be omitted in the interest of conciseness of disclosure.

The preceding description of the general organization of the data processing apparatus and control system, and the details of physical construction and functional operation of exemplary portions of the control apparatus, makes evident the attainment of the aforestated objects of the present invention. Also evident is the fact that with an exemplary embodiment of applicants' invention thus disclosed, modifications and changes therein will occur to those skilled in the art. Accordingly it is not desired to limit the invention to the particular physical arrangement and apparatus disclosed as preferred exemplary embodiment, for the invention is susceptible of embodiment in various forms all coming within the legitimate and valid scope of the appended claims.

What is claimed is:

1. A digital data processing program control system comprising in combination: an array of non-linear magnetic devices; a plurality of latch means; a plurality of control lines each connected to and controlled by a respective one of said latch means; a plurality of sense lines, each connected to and effective upon formation of a signal thereon to set a respective one of said latch means and each sense line being inductively linked to a set of at least one of said magnetic devices, at least one of said sense lines being inductively linked to a plurality of said magnetic devices, and at least one of said magnetic devices being linked to a plurality of said sense lines; magnetic device selecting and driving means to sequentially select and change the state of single ones of the magnetic devices of said array to thereby form a signal on each sense line inductively coupled thereto; and sets of data processing logical circuitry each respective set connected to and controlled by a respective one of said control lines.

2. A digital data processing program control system comprising, in combination: an array of magnetic cores including sets of cores each set of which is assigned to a respective data processing command, and each core arranged upon change of state to control a respective operations interval of one of the commands; a plurality of latch means; a plurality of control lines each connected to and controlled by a respective one of said latch means; a plurality of sense lines, each connected to and effective upon formation of a signal thereon to set up a respective one of said latch means, and each sense line being inductively linked to a set of at least one of said magnetic cores, and at least one of said sense lines being linked to a plurality of said magnetic cores, and at least one of said cores being linked to a plurality of said sense lines; core selecting and driving means cyclically operable to select and non-linearly change a core of said array, one core for each operations interval, to thereby form a signal on each sense line inductively linked thereto; and sets of data processing means each connected to and controlled by a respective one of said control lines.

3. A digital data processing program control system according to claim 2, in which interconnecting means are provided between said core selecting and driving means and said data processing means, for control of selection of a core in dependence upon the result of the data processing means.

4. A digital data processor program control system comprising, in combination with a plurality of sets of logical circuits for performing logical operations upon data in response to concurrent application thereto of respective sets of proposition potentials and a control potential: means including a plurality of latching circuits arranged, when set up, each to supply a respective control potential to at least one of said sets of logical circuits; means including a plurality of non-linear devices each normally biased to an inactive condition and each assigned a different set of one or more sense lines on all of which an output is produced in response to non-linear change of the device, at least one of said sense lines being assigned to a plurality of said non-linear devices, and at least one of said non-linear devices being assigned a set of a plurality of sense lines, and means connecting each sense line to a respective one of said latching circuits for setting up the latching circuit in response to an output on the sense line; means to select and overcome the bias on the selected one of said non-linear devices whereby the set of latching circuits respectively connected to the sense lines assigned to the selected devices supply control potential to the logical circuits connected thereto for performance of a particular set of logical operations; and means to utilize the results of at least one of said particular set of logical operations in a succeeding selection of a particular one of said non-linear devices to control subsequent operations in said set of logical circuits.

5. A digital data processing system comprising, in combination: means including a data storage system, operative means for performing arithmetic operations upon data and including a plurality of sets of logical data processing elements, and means for transferring data between the storage system and the logical data processing elements; means including a plurality of latch means, each effective when set up to supply a potential signal representing a logical proposition to at least one respective set of logical data processing elements, connections therefor, and each latch means having a respective sense line connected to set up the latch when pulsed; means including an array of bistable magnetic cores each linking at least one of said sense lines, at least one of said sense lines linking a plurality of said cores, whereby a pulse is induced in each sense line in response to the change of state of any core to which the sense line is linked, and at least one of said cores linking a plurality of said sense lines; selective drive means including a set of at least one of drive lines, effective to select a specific one of said cores and drive the same to change the state thereof; timing means supplying repetitive pulses in cyclical series; and means controlled by said logical data processing elements and said timing means for operating said selective drive means.

6. A digital data processing system comprising, in combination: timing means to demark substantially equal periods of time in a continuing series, each by an electric potential pulse, and to repetitively count a fixed number of such pulses to demark a continuing series of successive cycles and supply respective pulses for each of a significant number of said periods; means including a data storage system and arithmetic means for performing arithmetic logical operations on data and means for transferring data between the storage system and the arithmetic means, said arithmetic means comprising a plurality of sets of logical networks each capable of performing a logical operation in response to application of a set of potentials including at least one logical proposition potential and one operations control potential; means including latching circuits each effective when set up, to supply operations control potential to a respective group comprising at least one of said sets of logical networks; means including a plurality of bistable devices each normally biased to one stable state and effective when reversed in state to provide a signal effective to set up a predetermined number of said latching circuits, at least one of said bistable devices effective when reversed in state to provide signals effective to set up a plurality of said latching circuits, and at least one of said latching circuits being set up in response to the reversal of state of any of a plurality of said bistable devices; cyclically operable means operating once during each of said cycles for selecting and reversing the state of one of said bistable devices to set up a particular associated group of said latching circuits; means controllable by logical operations within said arithmetic means for controlling selecting operations of said cyclically operable means; and means effective to apply to elements of said networks individual pulses from said timing means and said control potentials.

7. A digital data processing system comprising, in combination: timing means to demark substantially equal intervals of time by respective electric pulses, and to count a number $n$ of such pulses in each of successive repetitive cycles and to supply each of $n$ electric count pulse lines in succession with a respective one of said pulses; a plurality of bistable latch means each having a respective output line normally at one of two logical potentials but set at the other logical potential incident to setting up of the respective latch means, and each latch means having a respective sense line connected to set up the latch means incident to occurrence of an electric pulse signal on the sense line, and each latch means having a reset means; an array of bistable operations-controlling devices each adapted to control data processing operations during one of said cycles and each arranged when reversed in state to produce an electrical signal in a set comprising at least one of the sense lines connected to said latches, at least one of said sense lines having an electrical signal produced therein in response to the reversal of state of any of a plurality of said devices, and at least one of said devices when reversed in state producing signals in a set comprising a plurality of sense lines; means including a plurality of logical networks for performing logical operations in response to logical propositions in the form of logical potentials supplied thereto; means for supplying the logical potentials on said output lines to respective ones of said logical networks; means for supplying certain ones of said $n$ pulses as logical potentials to certain ones of said logical networks; and means including said timing means, for selecting and changing the state of one of said bistable operations-controlling devices during a respective one of said repetitive cycles.

8. A digital data processor program control system, comprising in combination: an arithmetic unit comprising a plurality of sets of logical operations elements; latch means, one for each of said sets of operations elements, and each connected and arranged when energized to render potentially active the respective set of operations elements for performing operations upon digital information supplied thereto; an array of bistable magnetic cores; means for selecting and driving individual cores of said array; and sense lines each of a plurality of which are inductively linked to a plurality of said cores and connected to energize a respective one of said latch means in response to reversal of state of any core to which the sense line is inductively linked; whereby any of said sets of operational elements may be employed in computer operations in any selected group of computer command operations by linking its respective latch-energizing sense line with the cores representing respective ones of said group of computer command operations and whereby each of a plurality of said sets of operational elements may be used in each of different computer command operations 9. In a data processor, the combination of: a plurality of operational circuits; an array of bistable magnetic cores provided with row and column drive lines; selecting means connected to said drive lines for selecting and driving any one of the cores of the array; a set of one or more sense lines inductively linked each to at least one of said cores and at least one of said sense lines in ductively linked to a plurality of said cores; and a plurality of latching circuit means, each connected to a respective one of said sense lines for latching operation in response to change of state of any core inductively linked to the sense line connected thereto; whereby as each core is selected and driven the latching circuits whose sense lines are linked to the selected core are set to form program control signals, one program control signal for each sense line which is inductively linked to the selected core; each of said program control signals so formed being coupled to a respective one of said operational circuits for controlling the operation thereof.

10. In a data processor, the combination of: a plurality of logical circuits; and column drive lines; a first means for selecting and supplying drive current through one of said row drive lines; a second means for successively selecting and supplying drive current through the selected one of said column drive lines while said first means continues to supply drive current through the selected row drive line, to thereby select and reverse the state of said cores one at a time; bias means including a bias line through all of said cores to supply drive current through said cores and return a core to its initial state after being selectively driven to a reverse state by said first and second means; a plurality of sense lines extending through each core on which signals are generated when said core is driven to a reverse state, at least one of said sense lines extending through a plurality of said cores; latching circuits each connected to a respective sense line to be set by signals on said sense line; and outputs each from a respective latching circuit, on which a program control signal is supplied when said latching circuit is set to respective ones of said plurality of logical circuits.

11. A digital data processing system whose operations are sequentially divided into fixed operations intervals comprising: an array of magnetic cores; a plurality of sense lines inductively linked each to at least one of said cores, at least one of said sense lines being inductively linked to a plurality of said cores, and at least one of said cores linking a plurality of said sense lines; each said core assigned to define the nature of the processing operations performed by the system on successive operations intervals; control means sequentially operable at the beginning of each of said fixed operations interval to select and non-linearly drive one of the cores to thereby generate output signals indicative of the operations interval on the sense lines linked thereto; a latch circuit connected to each respective sense line and effective when set up by an output signal on the sense line to supply a control signal; an arithmetic unit for performing logical operations and including a plurality of composite logical circuits each capable of producing a signal representing a different logical proposition and each composite logical circuit including individual logical circuits each capable of producing a signal indicative of a different form of a proposition according to the respective output control signals generated by the latch circuits during an operations interval; the sequential operation of said control means, at the end of each operations interval being in turn controlled according to the form of at least one of the propositions produced from the arithmetic unit during an operations interval.

12. In a data processing apparatus comprising data storage means, arithmetic means for performing data processing operations in response to application of high logical potentials to respective specific parts thereof, and data transferring means, operations controlling means for said apparatus, comprising: electrical means including counting means to demark successive periods of time by corresponding electric pulses produced in repetitive series each of which series demarks an operations cycle and pluralities of which cycles are assignable to any one of particular groups of related data processing operations termed commands; a plurality of magnetic cores having non-linear magnetization characteristics; a plurality of sense lines each inductively linked to a respective set of at least one of said magnetic cores, at least one of said magnetic cores having a plurality of sense lines inductively linked thereto, and at least one of said sense lines being linked to a plurality of said cores; means including a plurality of bistable devices each controlled by a respective one of said sense lines and responsive to change of state of any of said cores inductively linked to the respective sense line, to provide a predetermined potential on a respective control line; a plurality of control lines, each connected as an output line from a respective one of said bistable devices and connected to control application of a said predetermined potential to a respective part of said arithmetic means for performance of arithmetic operations; means for supplying selected ones of said electric pulses to said arithmetic means as logical propositions; and means repeatedly controlled by operations within said arithmetic means and responsive to at least selected ones of said electric pulses, to select and non-linearly change the magnetic condition of one of said magnetic cores; whereby said controlling means is effective to determine and effect specific data-processing operations according to decisions produced within said apparatus.

13. In a data processing system in which logical operations are in general performed in series of operations termed commands a plurality of which comprise a series of related steps a plurality of which require an operations interval of which a plurality are substantially equal, apparatus for controlling the logical operations, comprising: means including a plurality of sets of non-linear devices, each set assignable to a respective one of the commands, and each non-linear device operative by non-linear change to control operations in a respective operations interval; means operable once for each operations interval to select and non-linearly change a selected non-linear device; a plurality of sense lines, at least one of which is linked to a plurality of said non-linear devices, and at least one of said non-linear devices being linked to a plurality of said sense lines; and means for employing the signal induced in each of the sense lines linked to a selected non-linear device to control the performance of a respective part of the logical operations in said system.

14. In a data processing system in which logical operations are principally performed in series of operations termed commands, at least some of which commands comprise a plurality of related steps each of which steps requires a time interval that is the same for all of said related steps, an apparatus for controlling the logical operations, comprising: means including a plurality of sets of bistable magnetic cores, each set assignable to a respective one of the commands and each of the said cores operative by change of state to control operations within a respective time interval; means operable within each of said time intervals to select and change the state of a selected one of said cores; a plurality of sense lines, at least one of which is inductively linked to a plurality of said bistable magnetic cores, and at least one of said cores being inductively linked to a plurality of said sense lines; and means for employing the signal induced in each sense line linked to a selected core to control the performance of a respective part of the logical operations in said system.

15. In a data processing apparatus comprising data storage means, arithmetic means for performing data processing operations in response to application of predetermined logical potentials to respective specific parts thereof, and data transferring means, operations controlling means for said apparatus, comprising: electrical means for producing time-spaced electric pulses; a plurality of bistable magnetic cores; a plurality of sense lines each inductively linked to a respective set of at least one of said magnetic cores, at least one of said sense lines being inductively linked to a plurality of said cores, and at least one of said cores being inductively linked to a plurality of said sense lines; means including a plurality of bistable devices each controlled by a respective one of said sense lines and responsive to change of state of any of said cores inductively linked to the respective sense line, to provide a predetermined logical potential on a respective output line; a plurality of control lines, each connected as an output line from a respective one of said bistable devices and connected to control application of a said predetermined logical potential to a respective part of said arithmetic means, for performance of arithmetic operations; and means repeatedly controlled by operations within said arithmetic means and responsive to at least selected ones of said electric pulses, to select and reverse the state of one of said magnetic cores; whereby said controlling means is effective to determine and effect specific data-processing operations according to operations performed within said apparatus.

16. In a data processing apparatus comprising data storage means, arithmetic means for performing data processing operations in response to application of predetermined logical potentials to respective specific parts thereof, and data transferring means, operations controlling means for said apparatus, comprising: electrical means including counting means to demark successive periods of time by corresponding electric pulses produced in repetitive series each of which series demarks an operations cycle and pluralities of which cycles are assignable to any one of particular groups of related data processing operations termed commands; sets of bistable magnetic cores, each set assigned to control operations within a respective data processing command and each core effective upon change of state to provide control of processing operations during the succeeding operations cycle; control units each having a sense line inductively linked to a predetermined number of said cores, at least one of said control units having its sense line inductively linked to a plurality of said cores, each control unit also having output means for providing a predetermined logical potential to respective parts of the arithmetic means in response to a signal induced on its sense line when any of the magnetic cores to which the sense line is inductively linked undergoes a change of state; and means controlled by operations within said arithmetic means and responsive to at least one of said electric pulses in each of said cycles, to select and reverse the state of one of said bistable magnetic cores; whereby during each of said operations cycles said operations controlling means is effective to determine and carry out specific data-processing operations according to operations performed within said apparatus.

17. In a data processing apparatus comprising data storage means, arithmetic means for performing data processing operations in response to application of predetermined logical potentials to respective specific parts thereof, and data transferring means, operations controlling means for said apparatus, comprising: electrical means including counting means to demark successive periods of time by corresponding electric pulses produced in repetitive series each of which series demarks an operations cycle and pluralities of which cycles are assignable to any one of particular groups of related data processing operations termed commands; sets of bistable magnetic cores, each set assigned to control operations within a respective data processing command and each core effective upon change of state to provide control of processing operations during the succeeding operations cycle; control units each comprising a bistable element and means for setting said bistable element in response to the change of state of any one of a respective group of magnetic cores associated therewith, each control unit also having a control line output upon which a predetermined logical potential is provided in response to the setting of its bistable element; means connecting the control lines to respective ports of the arithmetic means for furnishing predetermined logical potential thereto; whereby during each of said operations cycles said operations controlling means is effective to determine and carry out specific data-processing operations according to operations performed within said apparatus.

18. In a digital data processing apparatus adapted to perform data processing operations by repetitive operations steps and including data storage means, data transferring means, and arithmetic means for performing arithmetic data processing operations in response to concurrent application of predetermined logical potentials to specific parts of the arithmetic means, operations controlling means for said apparatus, comprising: electrical means including counting means to demark successive periods of time by corresponding electric pulses produced in repetitive series each of which series demarks an operations cycle and pluralities of which cycles are assignable to any one of particular groups of related data processing operations termed commands; sets of bistable magnetic cores, each set assigned to control operations within a respective data processing command and each core effective upon change of state to provide control of data processing operations during the succeeding operations cycle; control units each comprising a bistable element and means for setting said bistable element in response to the change of state of any one of a respective group of said magnetic cores associated therewith, each control unit also having a control line output upon which a predetermined logical potential is provided in response to the setting of its bistable element; means for resetting the bistable elements of said control units once during each cycle; means connecting the control lines to respective parts of the arithmetic means for furnishing predetermined logical potential thereto; means for applying specific ones of said electric pulses to certain parts of said arithmetic means for furnishing logical proposition potentials thereto; and means effective once in each one of the operations cycles for changing the state of one of said cores to assign control of operations in the next succeeding operations cycle, and including a plurality of bistable decision flip-flop whose condition of state is determined by operations of said arithmeitc means and whose outputs constitute results of operations which are effective to govern selection of that one of said magnetic cores to be changed in state for control of the said next succeeding operations cycle, whereby during each of said operations cycles said operations controlling means is effective to determine and carry out specific data-processing operations according to operations performed within said apparatus.

19. For a data-processing apparatus comprising arithmetic means for performing data-processing operations in response to application thereto of logical potentials, control-means constructed and arranged to control operations of the apparatus according to a repetitive cyclical procedure, said control-means comprising: electrical means, including a counter constructed and arranged to provide a continuing series of time-spaced electric pulses, each series demarking a time interval, one interval for each of respective sequential steps of data-processing operations; electrical lines, each effective when energized to a logical potential to provide a logical potential to a respective part of the arithmetic means and connected thereto; means including sense lines each connected to a respective one of said electrical lines and upon respective ones of which sense lines respective logical potentials may be generated; and means, including a plurality of magnetic devices, effective once for each of the demarked time intervals, for selecting and actuating one of said magnetic devices to produce upon each of a corresponding set of at least one of said sense lines a respective logical potential for production on the respective control line of a logical potential, to control the corresponding part of the arithmetic means, at least one of said magnetic devices when actuated producing a logical potential upon each of a plurality of sense lines, and at least one of said sense lines having a logical potential produced thereon in response to the actuation of any of a plurality of said magnetic devices.

20. A digital data processing program control system comprising in combination: a plurality of magnetic elements, selection means for changing the state of at least one of said magnetic elements, a plurality of sense lines, at least one of said sense lines being inductively linked to a plurality of said magnetic elements and at least one of said magnetic elements being inductively linked to a plurality of said sense lines, a plurality of logial circuits, and means coupling each of said sense lines to predetermined ones of said logical circuits to control the operation thereof.

21. A digital data processing program control system comprising in combination: a plurality of magnetic elements, selection means for changing the state of at least one of said magnetic elements, a plurality of sense lines, at least one of said sense lines being inductively linked to a plurality of said magnetic elements and at least one of said magnetic elements being inductively linked to a plurality of said sense lines, a plurality of logical circuits, and means coupling each of said sense lines to predetermined ones of said logical circuits to control the operation thereof, said selection means being coupled to said logical circuits so that the selection made thereby is in accordance with the outputs of predetermined ones of said logical circuits.

22. In a data processing system having a plurality of logical circuits by means of which logical operations are performed during an operating cycle of said system, improved means for controlling said plurality of logical circuits during each operating cycle comprising: a plurality of sense lines, means coupling said sense lines to respective ones of said logical circuits so that a signal induced in a sense line controls the operation of its respective logical circuit, a plurality of magnetic elements each of which corresponds to a particular type of operation to be performed during an operating cycle, each of said magnetic elements being inductively linked to those sense lines whose respective logical circuits are to be controlled to provide the particular type of operation to which each magnetic element corresponds, at least one sense line being inductively linked to a plurality of magnetic elements and at least one magnetic element being inductively linked to a plurality of said sense lines, and selection means capable of changing the state of a selected one of said magnetic elements each operating cycle so as to induce a signal on each of the sense lines inductively linked thereto, each selection means being coupled to said logical circuits so that the selected magnetic element is chosen in accordance with the results of predetermined logical operations performed during the previous operating cycle.

References Cited in the file of this patent

UNITED STATES PATENTS

| | | |
|---|---|---|
| 2,734,183 | Rajchman | Feb. 7, 1956 |
| 2,734,184 | Rajchman | Feb. 7, 1956 |
| 2,734,187 | Rajchman | Feb. 7, 1956 |
| 2,775,402 | Weiss | Dec. 25, 1956 |
| 2,843,838 | Abbott | July 15, 1958 |
| 2,933,720 | Newhouse et al. | Apr. 19, 1960 |
| 2,954,166 | Eckdahl et al. | Sept. 27, 1960 |

FOREIGN PATENTS

| | | |
|---|---|---|
| 167,102 | Australia | Feb. 27, 1956 |

OTHER REFERENCES

A Function Description of the Edvac, The University of Pa., Moore School of Electrical Engineering, Philadelphia, Pa. Sheet 104–7LD–1 and pps. 7–3 to 7–6 relied on.